(12) United States Patent
Shimada et al.

(10) Patent No.: US 7,079,144 B1
(45) Date of Patent: Jul. 18, 2006

(54) CURVE GENERATING DEVICE AND METHOD, AND PROGRAM RECORDED MEDIUM

(75) Inventors: Shigehiro Shimada, Tokyo (JP); Junichi Tsukamoto, Tokyo (JP); Takashi Totsuka, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/673,202

(22) PCT Filed: Feb. 25, 2000

(86) PCT No.: PCT/JP00/01123

§ 371 (c)(1),
(2), (4) Date: Dec. 4, 2000

(87) PCT Pub. No.: WO00/51079

PCT Pub. Date: Aug. 31, 2000

(30) Foreign Application Priority Data

Feb. 26, 1999 (JP) ................................. 11-051867

(51) Int. Cl.
*G06T 11/20* (2006.01)

(52) U.S. Cl. ...................... 345/442; 345/589; 345/606; 345/643; 345/648; 345/467; 382/199; 382/201; 382/203; 382/236; 382/316

(58) Field of Classification Search ................ 345/442, 345/964, 951, 441, 648, 643, 959; 382/316, 382/199, 201
See application file for complete search history.

(56) References Cited

U.S. PATENT DOCUMENTS

| | | | | |
|---|---|---|---|---|
| 4,910,786 A | * | 3/1990 | Eichel | 382/199 |
| 5,287,441 A | * | 2/1994 | Nakamura | 345/442 |
| 5,594,852 A | * | 1/1997 | Tankelevich | 345/441 |
| 5,598,182 A | * | 1/1997 | Berend et al. | 345/619 |
| 5,966,141 A | * | 10/1999 | Ito et al. | 345/473 |
| 5,970,173 A | * | 10/1999 | Lee et al. | 382/236 |
| 6,343,099 B1 | * | 1/2002 | Ogura | 375/240.16 |
| 6,453,069 B1 | * | 9/2002 | Matsugu et al. | 382/173 |

FOREIGN PATENT DOCUMENTS

| | | | |
|---|---|---|---|
| JP | 10-40395 | | 2/1998 |
| JP | 10-040395 | * | 2/1998 |
| JP | 10-164436 | * | 6/1998 |

* cited by examiner

*Primary Examiner*—Matthew C. Bella
*Assistant Examiner*—Antonio Caschera
(74) *Attorney, Agent, or Firm*—Sonnenschein Nath & Rosenthal LLP

(57) ABSTRACT

A user gives, as input, two curves at a start time and at an end time and reference correspondence points with respect to the respective curves. Then, a pursuit operation of pursuing a reference correspondence point is carried out with respect to picture images successive in the time axis direction. As a result, positions of reference correspondence points at respective intermediate stages can be determined. Then, interpolation of the shape is carried out. Then, the determined interpolated shape is deformed in correspondence with the determined reference correspondence point. Accordingly, even in the case where a contour shape does not linearly move, it is possible to precisely pursue correspondence points on the contour. Thus, a contour shape with higher precision can be prepared.

12 Claims, 31 Drawing Sheets

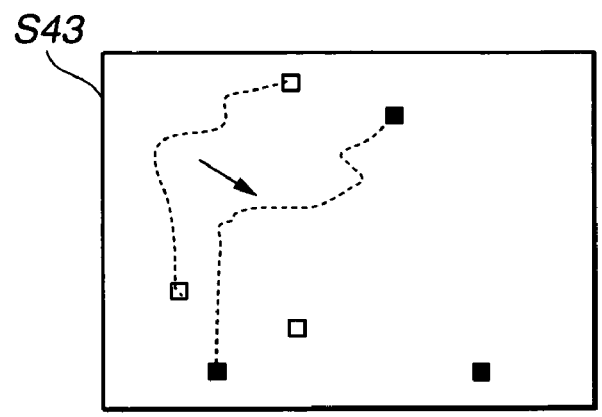
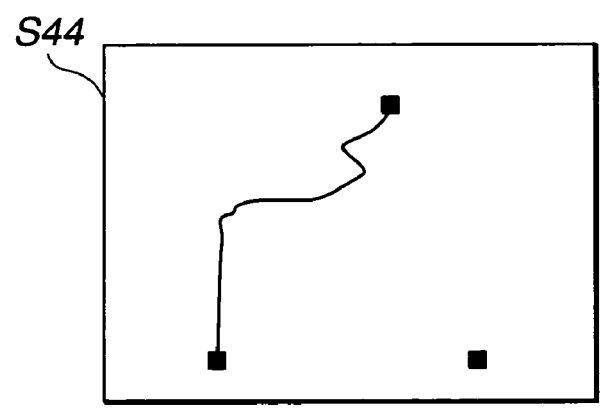
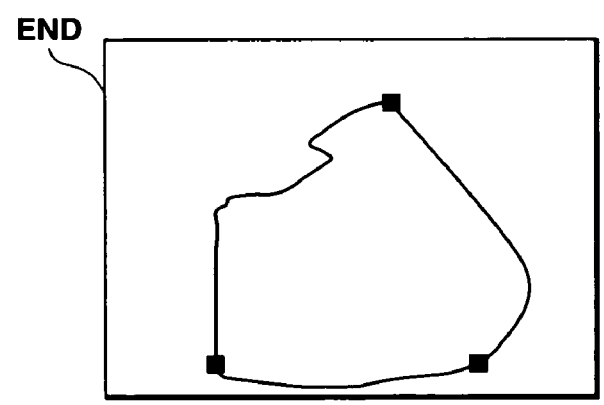
FIG.18

The Live-Wire 2-D dynamic programming (DP) graph search algorithm is as follows:

Algorithm: Live-Wire 2-D DP graph search.

Input:
- s             {Start(or seed) pixel.}
- l(q,r)      {Local cost function for link between pixels q and r.}

Data Structures:
- L             {List of active pixels sorted by total cost (initially empty).}
- N(q)       {Neighborhood set of q (contains 8 neighbors of pixel).}
- e(q)       {Boolean function indicating if q has been expanded/processed.}
- g(q)       {Total cost function from seed point to q.}

Output:
- p             {Pointers from each pixel indicating the minimum cost path.}

Algorithm:

```
g(s)=0; L=s;                        {Initialize active list with zero cost seed pixel.}
while L!=NULL do begin              {While still points to expand:}
   q=min(L)                         {Remove minimum cost pixel q from active list.}
   e(q)=TRUE;                       {Mark q as expanded(i.e.,processed).}
   for each r∈N(q) such that not e(r) do begin
      gtmp=g(q)+l(q,r);             {Compute total cost to neighbor.}
      if r∈L and gtmp < g(r) then   {Remove higher cost neighbor's}
         r=L;                       { from list}
      if !(r∈L) then begin          {If neighbor not on list,}
         g(r)=gtmp;                 { assign neighbor's total cost,}
         p(r)=q;                    { set (or reset) back pointer,}
         L=r;                       { and place on (or return to)}
      end                           { active list.}
   end
end
```

FIG.30

CURVE GENERATING DEVICE AND METHOD, AND PROGRAM RECORDED MEDIUM

TECHNICAL FIELD

This invention relates to a curve generating apparatus and a curve generating method used in CAD (Computer Aided Design), CG (Computer Graphics), etc. that edit a curve indicating contour shape of an object included within a picture image on the computer, and a program recording medium adapted so that a program relating to the curve generating method is recorded.

BACKGROUND ART

Hitherto, there are many instances where contour extraction processing for extracting a contour shape of an object included in plural picture image data constituting a moving picture image are used in the field of picture image processing, e.g., CAD, CG technologies, etc. Among these picture image processing methods, when picture image synthesis processing is carried out, there is the processing that generates key signals from the contour shape of the object, and it is important to generate precise or accurate key signals, i.e., precise contour shape. In this case, the key signal is information for cutting off the area of the foreground object to be synthesized and is also called a mask.

The contour extraction processing is required to have interactive operability as in the case where an operator gives in detail information such as contour position or direction, etc. with respect to the object. As an example of such contour extraction processing, there is processing to designate plural points on the contour of the object to prepare shapes between respective points, processing to operate control points of a parametric curve indicating a counter shape, and processing to directly input the contour shape by mouse, etc. As examples of these contour extraction processing methods, there are the known publications "Intelligent Scissors for Image Composition" (Eric N. Mortensen and William A. Barrett, Computer Graphics Proceedings, Annual Conference Series, 1995, ACM SIGGRAPH, pp. 191–198), "Image contour detection method" (Japanese Patent Application Laid Open No. 152481/1992 publication), and "Cutting mask preparation method and cutting mask preparation apparatus" (Japanese Patent Application Laid Open No. 254854/1992 publication).

Moreover, in the contour extraction processing, it is required to extract a precise contour shape with respect to all picture images constituting a moving picture. For example, in cinemas or television picture images, several hundreds of key signals are required for generating images of several seconds, and the quantity of processing is vast. For this reason, the contour extraction processing used in the field of cinema, etc. is desired (required) that a more precise contour shape can be prepared by a lesser number of operations. This results from the fact that, in the conventional contour extraction processing, processing for preparing contour shapes with respect to respective frames constituting a moving picture is processing that requires extremely much time and labor.

In view of the above, as a method of preparing a contour shape by a more simple procedure, there was proposed a method in which, on the premise that, in moving picture images having continuous property, a contour shape at the start frame changes with passage of time so that it changes to a contour shape at the end frame, an intermediate shape of a contour at the intermediate frame is prepared by interpolation processing from the contour shape at the start frame and the contour shape at the end frame.

In accordance with such an interpolation processing, as shown in FIG. 1, plural points constituting contour shape are caused to have a one-to-one correspondence relationship at the contour shape of the start frame and the contour shape of the end frame. Namely, when it is assumed that the curve indicating contour shape at the start frame (time t=0) is curve $C_0$, the curve indicating contour shape at the end frame (time t=1) is curve $C_1$, and the curve changes in point of time, it can be considered that curve $C_0$ at time t=0 changes to curve $C_1$ at time t=1. In view of the above, when time t at which interpolation of the two curves is carried out is assumed to be T, and the coordinate at the point on the curve $C_0$ is put by A and coordinate at the point on the curve $C_1$ corresponding to the coordinate A is put by B, the coordinate C at curve $C_x$ which takes required intermediate form can be represented as follows.

$$C = T \cdot A + (1-T) \cdot B$$

In the conventional interpolation processing, contour curve $C_x$ at the intermediate frame (t=T) was prepared from a train of points determined by such interpolating calculation.

Further, it is assumed that contour shapes with respect to respective frames are constituted by a plural third-order Bezier curve. The third-order Bezier curve is defined by $$Q(t) = ((1-t)^3)M + 3t((1-t)^2)N + 3(t^2)(1-t)O + (t^3)P$$
$$(0 \leq t \leq 1)$$

as indicated by the article "Computer Graphics PRINCIPLE AND PRACTICE SECOND EDITION in C" (Foley, van Dam, Feiner, Hughes, ADDISON WESLEY, 1996, ISBN 0-201-84840-6). In this formula, M, N, O, P are coordinates indicating points on the two-dimensional plane wherein M and P are end points of a line segment, and N, O are control points. An example of the line segment of the third order Bezier curve represented by the above-mentioned formula is shown in FIG. 2. In FIG. 2, the curve indicated by the solid line is the third-order Bezier curve, wherein M, P indicated by points of the black circle are end points, and points N, O indicated by the white circle are control points.

In accordance with the formula which defines the above-described Bezier curve, the locus of the third-order Bezier curve, i.e., shape is represented by coordinates of end points and control points indicated by points M, N, O, P and change of time t in FIG. 2.

When the constituting unit of the third-order Bezier curve shown in FIG. 2 is assumed to be a segment, it can be said that a single curve indicating contour shape is ordinarily composed of plural segments as shown in FIG. 3. In this case, end points of adjacent segments are shared so that one curve is constituted as the entirety.

In the above-described conventional contour extraction processing, in the case where the intermediate shape is determined from contour shapes of frames before and after a point in time, interpolation was carried out in the state where control points R and end points S constituting segments in FIG. 3 are caused to have a one-to-one correspondence relationship.

However, at frames before and after the point in time, there are instances where the contour shape does not linearly move.

In the above-mentioned method, in the case where a contour shape moves non-linearly, the shape is different from when the contour shape was prepared.

In order to avoid such problems, it is conceivable to carry out work to divide an interval of points in time between the time of start and the time of end into narrower ranges to carry out interpolation processing of the shape for a second time, or to manually modify the shape, etc. For this reason, there took place the problem that labor of the user was required in preparing the shape, and there took place fine unevenness of the shape because the shape that is prepared discontinuously changes in the time axis direction owing to manual modification.

DISCLOSURE OF THE INVENTION

This invention has been made in view of actual circumstances as described above, and its object is to provide a curve generating apparatus and a curve generating method in which, in the processing for preparing an intermediate shape of two curves, even in the case where the contour shape does not linearly move, it is possible to precisely pursue correspondence points on the contour, thus to prepare contour shapes with higher precision.

For this reason, the curve generating apparatus according to this invention is directed to a curve generating apparatus adapted for generating, from a curve to be generated of a first frame, a curve at a second frame, the apparatus comprising: correspondence point detecting means for determining, by using the curve to be generated of the first frame, correspondence points at the second frame corresponding to reference correspondence points set on the curve to be generated of the first frame; and curve generating means for generating the curve of the second frame passing through correspondence points detected by the correspondence point detecting means.

Moreover, the curve generating method according to this invention is directed to a curve generating method for generating, from a curve to be generated of the first frame, a curve at second frame, the method comprising: a correspondence point detection step of determining, by using the curve to be generated of the first frame, correspondence points at the second frame corresponding to reference correspondence points set on the curve to be generated of the first frame; and a curve generation step of generating the curve of the second frame passing through the correspondence points detected by the correspondence detection step.

In addition, the program recording medium according to this invention is directed to a program providing medium for providing program relating to curve generation processing for generating, from a curve to be generated of a first frame, a curve at a second frame, wherein there is recorded a program comprising: a correspondence point detecting step of determining, by using the curve to be generated of the first frame, correspondence points at the second frame corresponding to reference correspondence points set on the curve to be generated of the first frame; and a curve generation step of generating the curve of the second frame passing through the correspondence points detected by the correspondence point detection step.

BRIEF DESCRIPTION OF THE DRAWINGS

FIG. 18 is a view showing a more practical example of processing at the step S43 and steps subsequent thereto of the flowchart shown in FIG. 16.

FIG. 30 is a view showing one example of the shortest path search algorithm using dynamic programming.

BEST MODE FOR CARRYING OUT THE INVENTION

Preferred embodiments of this invention will now be described in detail with reference to the attached drawings.

Figure 1:
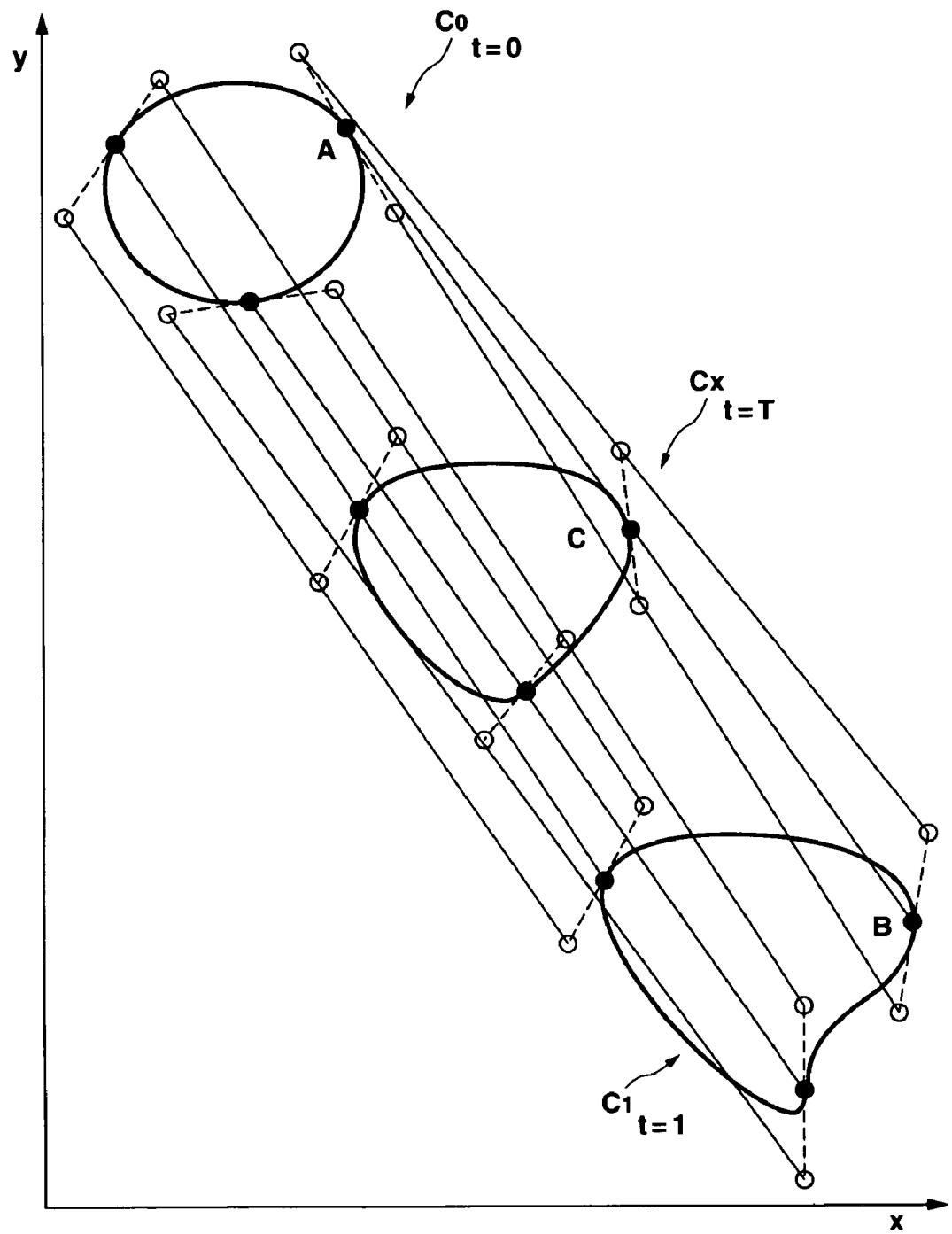
FIG. 1 is a view for explaining a method of preparing the shape of the intermediate frame by interpolation processing from the start frame to the end frame.
Figure 2:
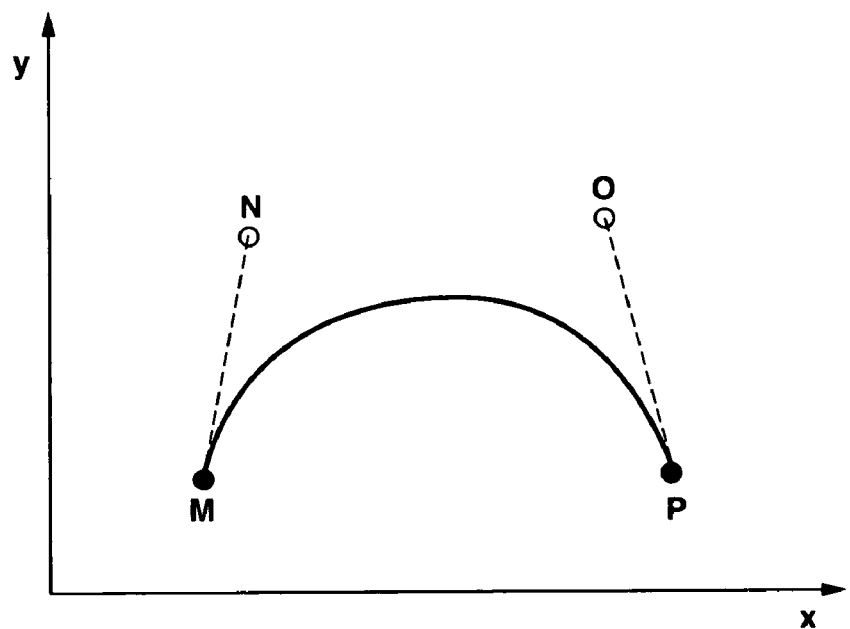
FIG. 2 is a view showing an example of the line segment of the third-order Bezier curve.
Figure 3:
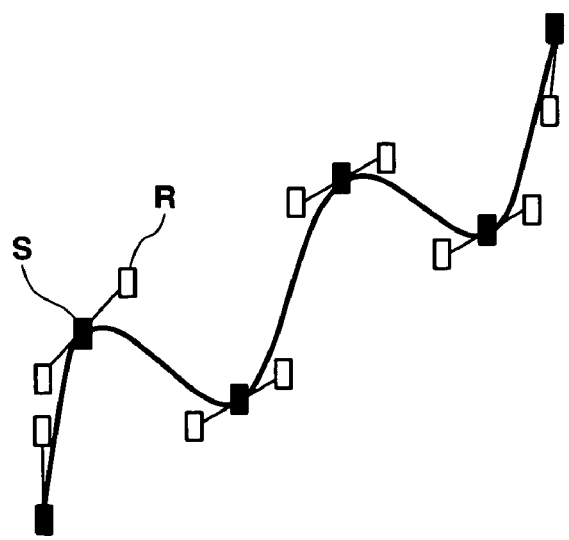
FIG. 3 is a view showing the single curve indicating contour shape as plural segments.
Figure 4:
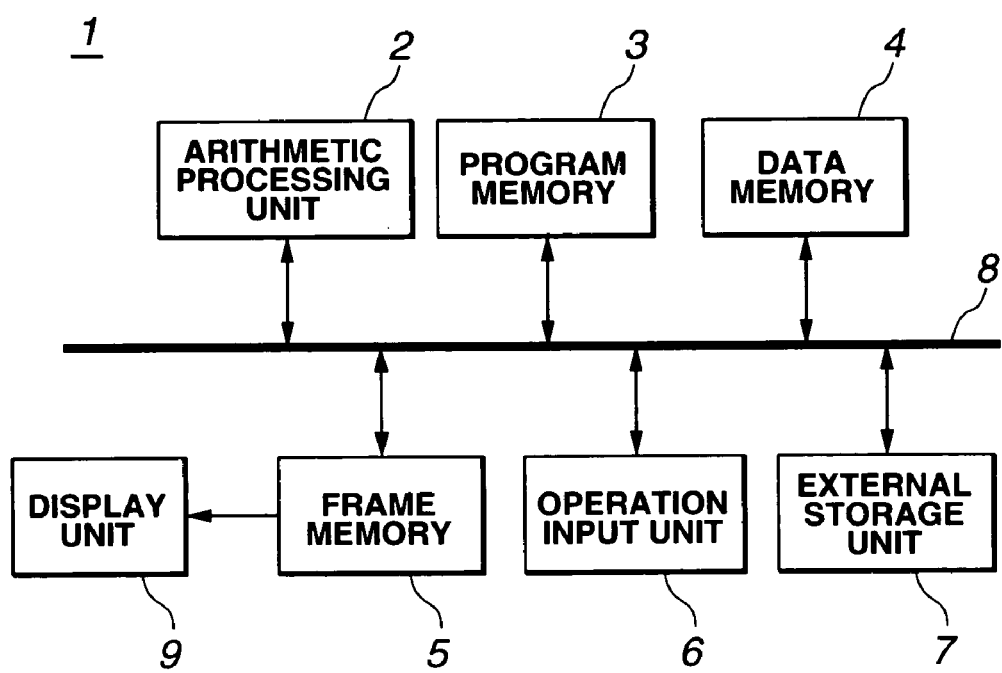
FIG. 4 is a block diagram showing configuration of a curve generating apparatus to which this invention is applied.

A curve generating apparatus 1 to which this invention is applied is caused to be of a configuration as shown in FIG. 4, for example. This curve generating apparatus 1 is adapted so that a program memory 3, a data memory 4, a frame memory 5, an operation input unit 6, and an external storage (memory) unit 7 are connected to an arithmetic processing unit 2 through a bus 8.

In the program memory 3, there is recorded a program for executing a curve generating method according to this invention. Namely, the program memory 3 records therein, as a software program, the curve generating method comprising a correspondence point detection step of determining, by using a curve to be generated or processed of the first frame, correspondence points at a second frame corresponding to reference correspondence points set on the curve to be generated of the first frame, and a curve generation step of generating a curve of the second frame passing through correspondence points detected by the correspondence point detection step.

The operation input unit 6 is comprised of, e.g., a keyboard and/or mouse, etc. and serves to generate an operation input signal as the result of the fact that it is operated by a user. This operation input unit 6 outputs the operation input signal to the arithmetic processing unit 2.

The arithmetic processing unit 2 generates control signals with respect to the above-described respective units in accordance with operation input signals from the operation input unit 6. Further, the arithmetic processing unit 2 outputs control signals thus generated to respective units to thereby carry out processing corresponding to the operation input signals. Namely, the arithmetic processing unit 2 conducts such a control to read out in sequence the software programs from the program memory 3 to execute them to generate contour curve indicating contours of curves to be generated included in respective frames by using picture data indicating moving picture stored in the external recording unit 7.

Picture image data processed by the software program from the program memory 3 is stored in the external storage unit 7 as described above. The external storage unit 7 comprises a recording medium, e.g., optical disc, etc. and outputs, in accordance with the control signal from the arithmetic processing unit 2, picture data indicating moving picture recorded on the recording medium to the arithmetic processing unit 2, the data memory 4 and the frame memory 5. In addition, the external storage (memory) unit 7 records, onto the recording medium, other picture data delivered from an external location.

Figure 5:
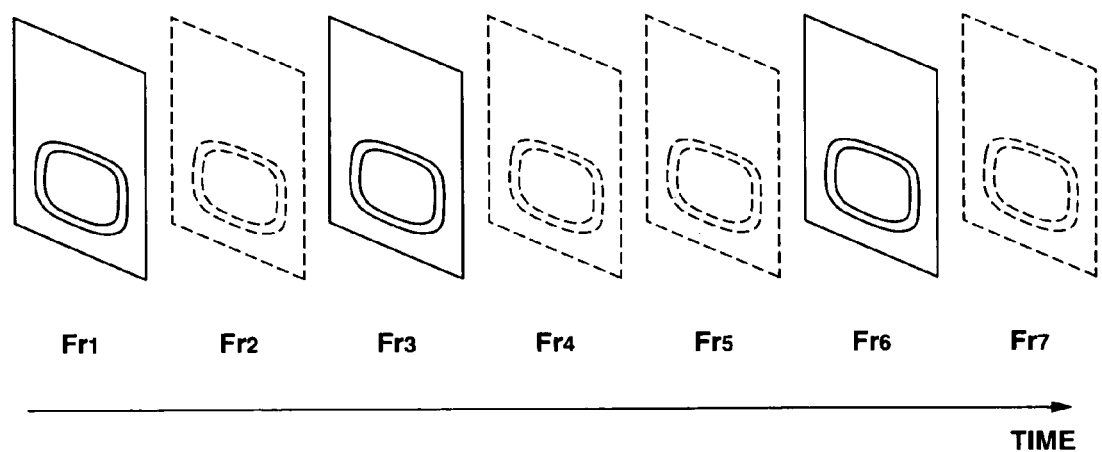
FIG. 5 is a view for explaining the moving picture consisting of plural frames to be processed at the above-mentioned curve generating apparatus.

As shown in FIG. 5, for example, picture image data stored in the external storage unit 7 consists of plural frames Fr1, Fr2, Fr3, Fr4, Fr5, Fr6 and Fr7 to constitute the moving picture. In this example, frame Fr1 is the start frame and the end frame with respect to the frame Fr1 is frame Fr3. Namely, this curve generating apparatus 1 executes the program relating to the curve generating method of this invention to thereby generate the intermediate curve with respect to frame Fr2 which is the intermediate frame by using first contour curve of data to be generated included in the frame Fr1 and second contour curve of data to be generated included in the frame Fr3.

In the data memory 4 of FIG. 4, there is stored the contour curve indicating the contour of the intermediate frame generated by the above-described arithmetic processing unit 2 for executing the program, etc. In addition, into this data memory 4, data in the middle of arithmetic processing by the arithmetic processing unit 2 is also stored.

Picture image data corresponding to one frame from the data memory 4 or the external storage (memory) unit 7, etc. is inputted to the frame memory 5 in accordance with the control signal of the arithmetic processing unit 2. Picture image data which has been read out by the control signal from, e.g., arithmetic processing unit 2 or the contour curve indicating the intermediate frame generated by the program, etc. is inputted to the frame memory 5. Further, this frame memory 5 is connected to a display unit 9 for displaying the picture image and/or processing content, etc. to the user, and outputs picture image data, etc. inputted in accordance with the control signal to the display unit 9 to thereby allow the display unit 9 to display thereon the picture image that the above-mentioned picture image data indicates.

Figure 6:
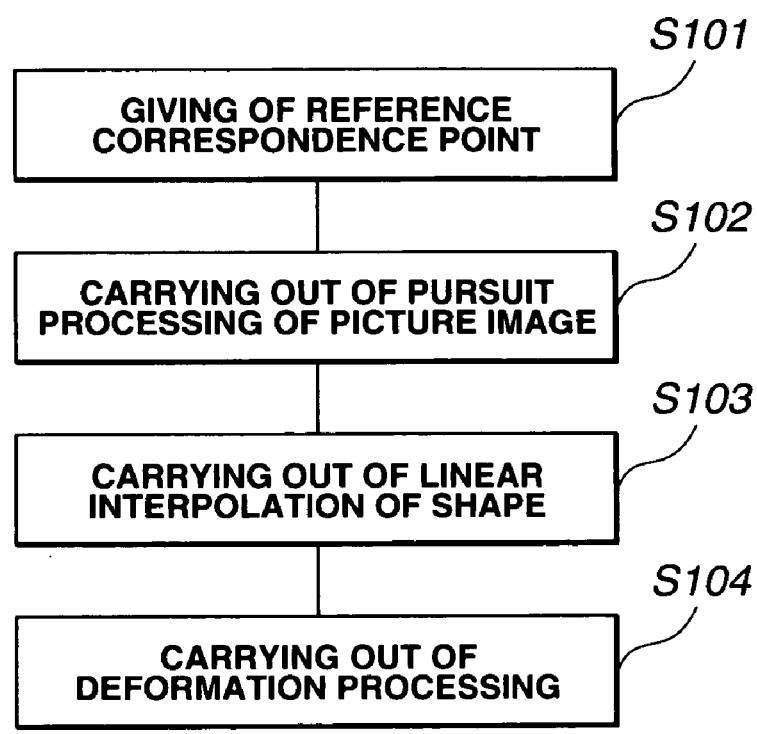
FIG. 6 is a flowchart showing the processing procedure in the software program relating to a curve generating method of this invention.

The program to which the curve generating method of this invention is applied is operated by the processing procedure shown in FIG. 6.

At step S101, the user gives, as input, two curves at the time of start and at the time of end and reference correspondence points with respect to respective curves. In this case, the two curves are respectively referred to as curves A and B. It is required that the numbers of the reference correspondence points are the same with respect to the curves A and B. Then, at step S102, the pursuit operation of the reference correspondence points is carried out with respect to picture images successive in the time axis direction. As a result, positions of reference correspondence points at respective intermediate stages can be determined. The detail thereof will be described later.

Then, at step S103, interpolation of the shape is carried out. In order to carry out shape interpolation, such an approach is employed to carry out the interpolation calculation of coordinates of point trains on the two curves that the user designates at the step S101 to thereby determine coordinates of points of the intermediate shapes. Although there may be employed any transformation (conversion) to provide the intermediate shape of two shapes, there is employed in this example the technology disclosed in the Japanese Patent Application No. 251492/1998 by the applicant of this application. The detail thereof will be described later.

Then, at step S104, the interpolated shape determined at the step S103 is deformed in correspondence with reference correspondence points determined by the pursuit operation at the step S102.

Accordingly, by executing the program, it can be equivalently said that the arithmetic processing unit 2 comprises a correspondence point detecting section for determining, by using the curve to be generated or processed of the first frame, correspondence points at the intermediate frame corresponding to the reference correspondence point set on the curve to be generated of the frame at the time of start, and a curve generating section for generating the curve of intermediate frame passing through the correspondence point detected by the correspondence point detecting section.

Particularly, the above-mentioned correspondence point detecting section carries out the picture image pursuit operation at the step S102 to detect where the reference correspondence point on the curve to be generated or processed of the frame at the time of start is positioned at the intermediate frame.

In addition, the curve generating section generates the curve passing through correspondence points detected by the correspondence point detecting section through the steps S103 and S104. In a more practical sense, when the frame at the time of end is assumed to be the third frame, the interpolated curve is determined by linear interpolation from the curve to be generated or processed of the first frame and the curve to be generated or processed of the third frame to deform the interpolated curve thus obtained into the curve passing through the correspondence points detected at the correspondence point detecting section.

Operations at the respective steps of FIG. 6, i.e., processing that the arithmetic processing unit 2 carries out will now be described in detail.

Figure 7:
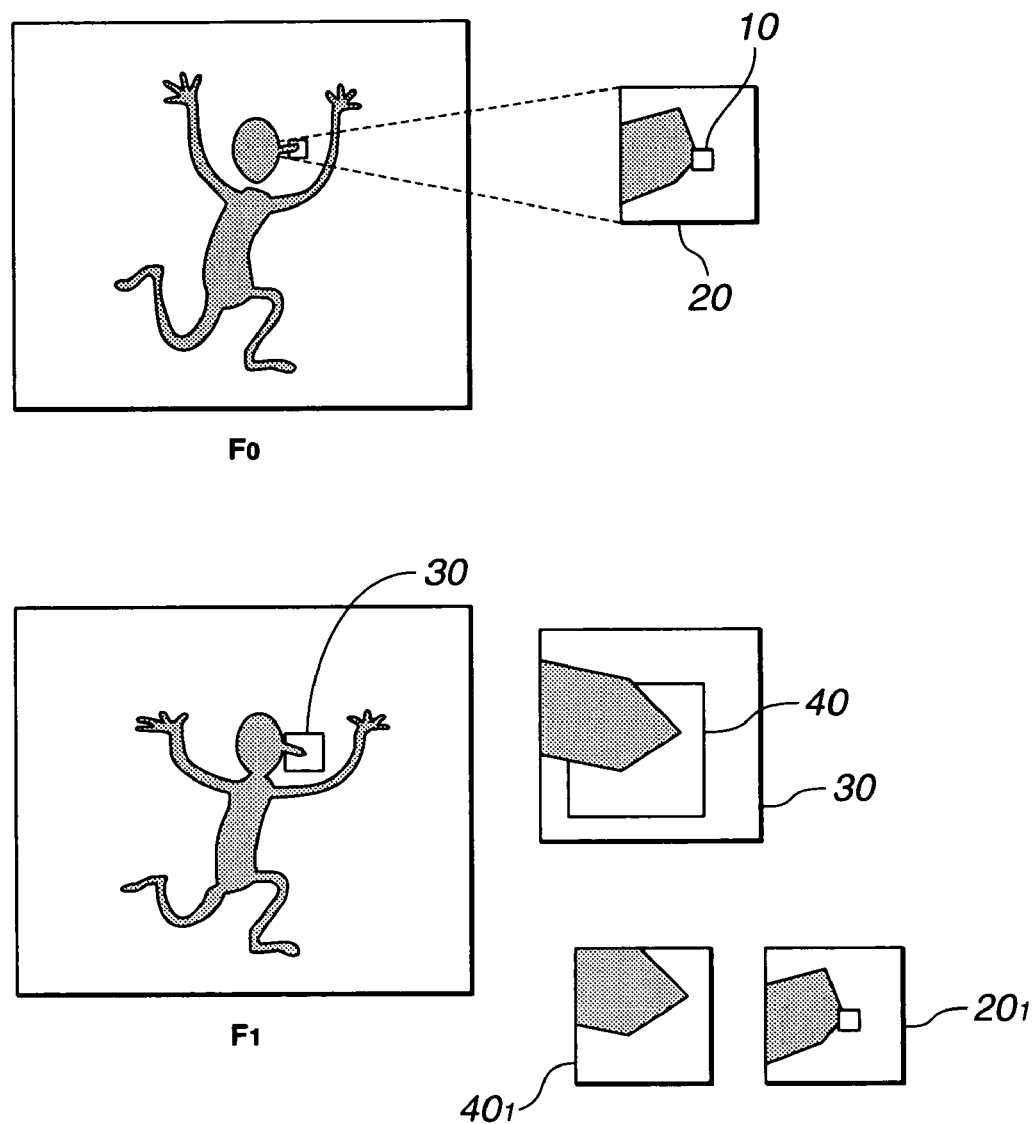
FIG. 7 is a view for explaining a method of carrying out pursuit by using the absolute value sum of differences of picture images as pursuing method for the picture image.

At step S102, there is carried out an operation to pursue positions of reference correspondence points in picture images successive on the time axis. As a method of pursuing the picture image, there may be employed any methods of pursuing points on the picture image. Here, explanation will be given with reference to FIG. 7 in connection with a method of carrying out pursuit by using the absolute value sum of differences of the picture images, which is known as SSD as an example. When the picture image around the reference correspondence point 10 at pursuit source frame $F_0$ shown in FIG. 7 is assumed as pursuit source image 20, pursuit destination images 40 are prepared with respect to all coordinates within the region of search range 30 designated at frame $F_1$, which is pursued as shown in FIG. 7 to calculate analogousness between two images, i.e., pursuit source image $20_1$, and pursuit destination image $40_1$. As a method of determining analogousness between images, there is used a method of determining absolute value sums of differences of respective pixel values within the image region with respect to two images $20_1$ and $40_1$ to allow them to be evaluation value to allow coordinates having the lowest evaluation value within the region to be the pursuit result.

Figure 8:
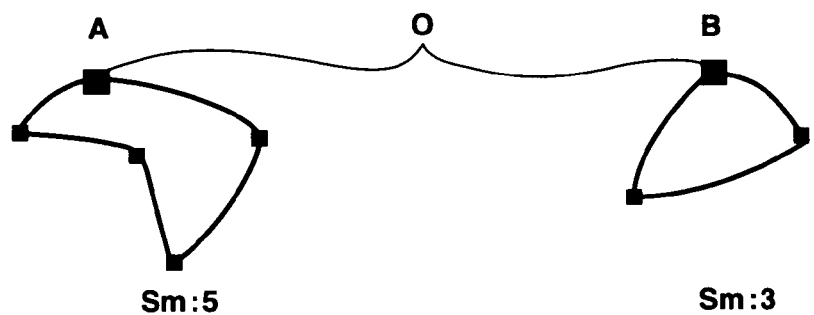
FIG. 8 is a view for explaining first contour curve A and second contour curve B used when the intermediate curve is generated by the curve generating apparatus.
Figure 9:
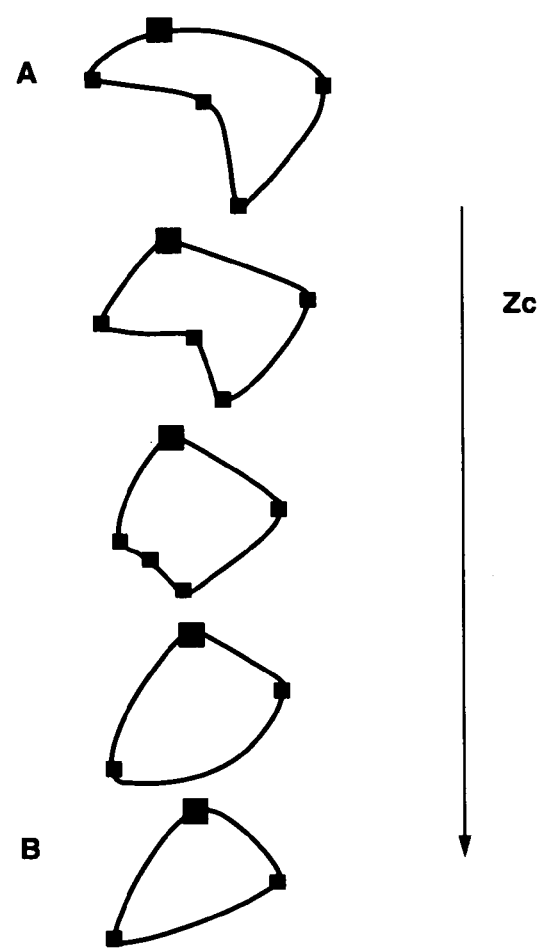
FIG. 9 is a view showing the intermediate curve generated by the curve generating apparatus from first contour curve A and second contour curve B.
Figure 10:
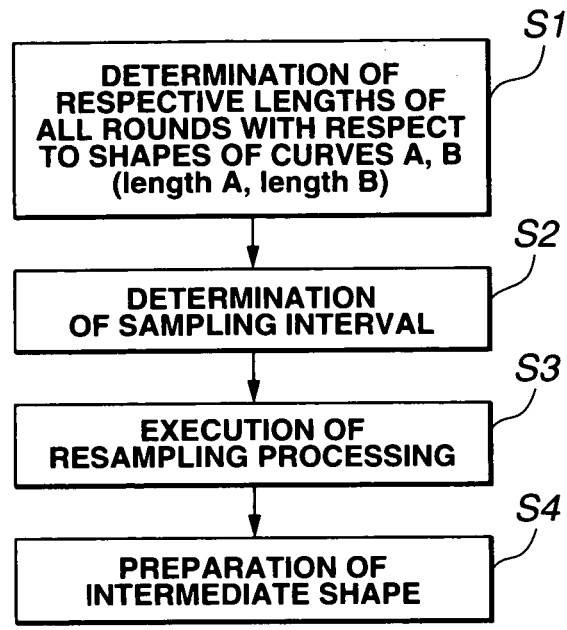
FIG. 10 is a flowchart showing processing when the intermediate curve is generated from the first contour curve A and the second contour curve B.

Explanation will now be described below in connection with the interpolation calculation of the shape at step S103. In FIG. 8, there are shown two curves where the numbers of segments are not in correspondence with each other. An example for generating the intermediate curve when the change from first contour curve A to second contour curve B takes place will now be described. In this case, when the end point, control point and line segment of the third-order Bezier curve are assumed to be one segment, the first contour curve A consists of five segments Sm and the second contour curve B consists of three segments Sm. In addition, when the intermediate curve in the case where the change from first contour curve A to second contour curve B takes place as shown in FIG. 9, for example, is generated (indicated as intermediate curve group $Z_C$ to be generated in FIG. 9), the procedure shown in the flowchart of FIG. 10 is executed.

Figure 11:
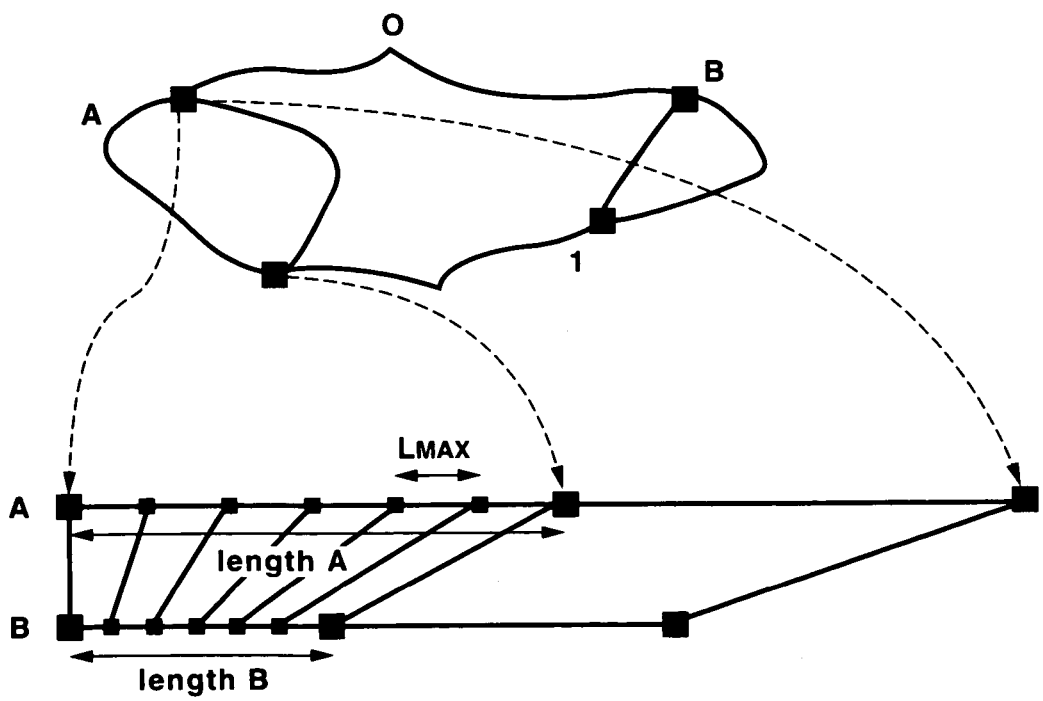
FIG. 11 is a view for explaining that sampling points are set to determine the sampling interval.

When the intermediate curve is generated, correspondence points indicating corresponding positions of the first contour curve A and the second contour curve B are designated by operation of the keyboard, etc. by the user. Thus, at step S1, correspondence points are set at the first contour curve A and the second contour curve B in accordance with the operation to the effect that the above-described correspondence points are designated to develop the first contour curve A and the second contour curve B into one straight line as shown in FIG. 11 to determine respective entire lengths of the first and second contour curves A and B, which are closed curves to allow the respective entire lengths of the first and second contour curves A and B to be length A and length B, respectively.

Figure 12:
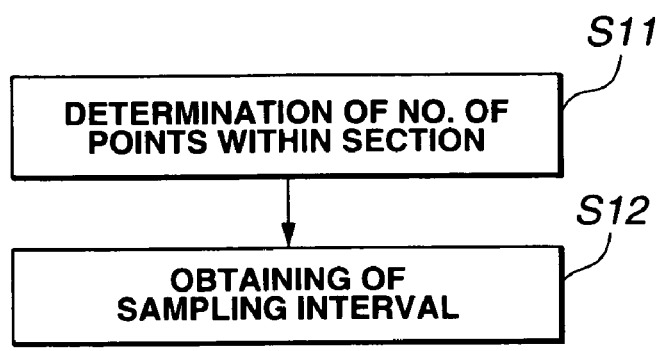
FIG. 12 is a flowchart showing processing when sampling intervals with respect to first contour curve A and second contour curve B are determined.

Then, at step S2, sampling intervals of the entire length A of the first contour curve A and the entire length B of the second contour curve B are determined. Namely, such an approach is employed to compare magnitudes (sizes) of the length A and the length B to divide one longer in length by a constant of the sampling interval to determine the number of points within the section (step S11 of the flowchart shown in FIG. 12). In this case, the constant of the sampling interval is the sampling interval where there can be obtained the number of points necessary for processing for re-constructing the curve which will be described later at processing for generating such intermediate shape. Then, such an approach is employed to divide the smaller one of magnitudes of length A and length B by the number of sampling points determined at the step S11 to obtain the sampling interval (step S12 of FIG. 12). For this reason, sampling operations are carried out by sampling intervals less than the maximum sampling interval $L_{MAX}$ with respect to both curves at all times.

Figure 13:
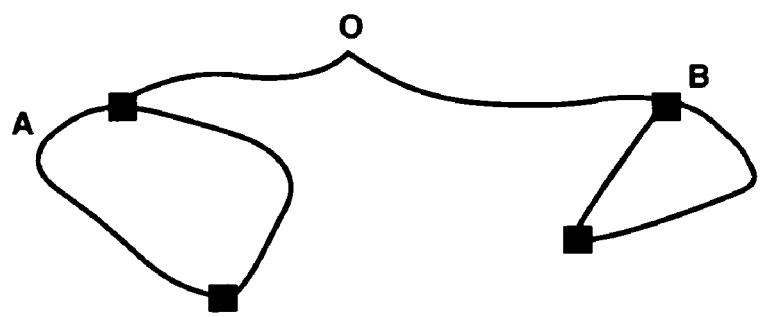
FIG. 13 is a view showing first contour curve A and second contour curve B from which the sampling interval is obtained.

Returning to FIG. 10, at step S3, resampling processing of curve A and curve B are carried out at sampling intervals determined at the step S2 to prepare point trains. Such state is shown in FIG. 13. FIG. 13 shows the state where resampling processing is carried out with respect to the first contour curve A and the second contour curve B by using sampling intervals obtained at step S11. In this case, points on segment of one Bezier curve can be represented as a function of time t as described below.

$$Q(t)=((1-t)^3)M+3t(1-t)^2)N+3(t^2)(1-t)O+(t^3)P$$
$$(0 \leq t \leq 1)$$

In the above formula, M, N, O, P are coordinates indicating points on the two-dimensional plane, wherein M, P are end points of line segment, and N, O are control points. Further, in order to represent, by t, points on the Bezier curve constituted by connecting plural segments, definition of the Bezier curve is extended to allow the integral part of t to be segment No. and to allow the decimal part of t to be time within the segment. Namely, in the case of t=3.45, this indicates the coordinate on the curve of the third segment and at time of 0.45. Thus, points on the Bezier curve constituted by plural segments are represented by t.

Figure 14:
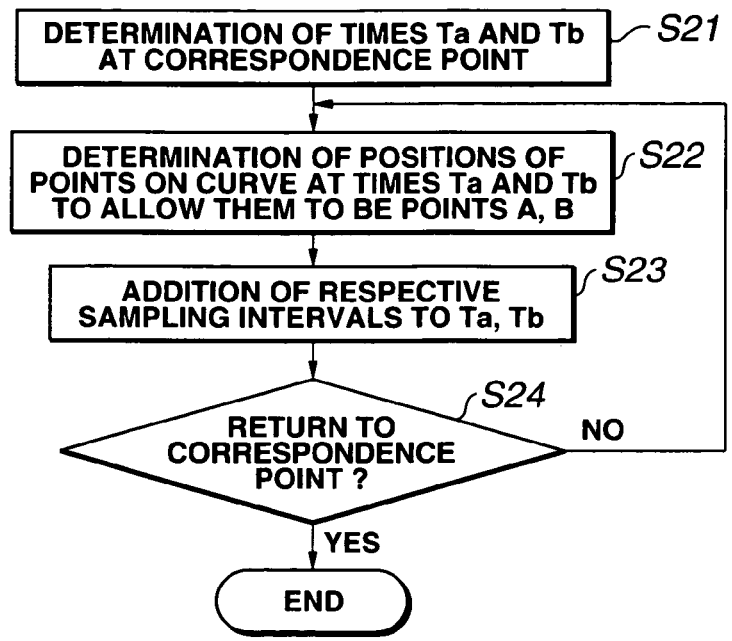
FIG. 14 is a flowchart showing processing when resampling processing is carried out.

Moreover, detailed the flowchart of resampling processing carried out at the step S3 of FIG. 10 is shown in FIG. 14. At step S21, when resampling processing is carried out, times at correspondence points of the first contour curve A and the second contour curve B corresponding to correspondence point O shown in FIG. 13 are set as Ta and Tb. At the subsequent step S22, coordinates of points on the first contour curve A and the second contour curve B at times Ta, Tb are determined. Respective points determined here result in sampling points at the first contour curve A and the second contour curve B. At the subsequent step S23, the sampling interval determined at the above-described step S2 of FIG. 10 is added to times Ta, Tb. At the subsequent step S24, there is judged whether or not times Ta, Tb reach terminating ends so that correspondence points return to correspondence points at the time of start of resampling processing. Further, when it is judged that the correspondence point returns to the correspondence point at the time of start, the processing is completed. On the other hand, when it is judged that the correspondence point does not return to the correspondence point, the processing returns to step S22 to repeat processing of the above-described steps S22 to S24 to set, for a second time, sampling points at the first contour curve A and the second contour curve B to generate the point train consisting of sampling points. Namely, in the resampling processing of the step S3 of FIG. 10, there are generated the point train corresponding to the first contour curve A and the point trains corresponding to the second contour curve B which consist of sampling points finer than those at the above-described sampling processing.

Figure 15:
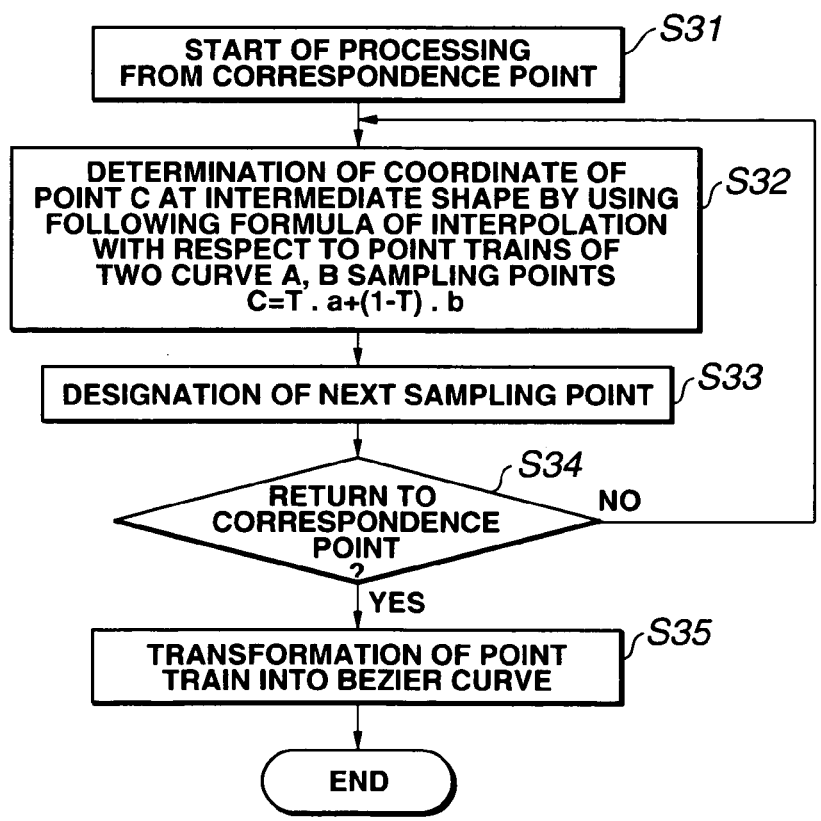
FIG. 15 is a flowchart showing processing when the intermediate curve indicating intermediate shape is generated.

Further, returning to FIG. 10, at step S4, such an approach is employed to carry out interpolation calculation of coordinates of the point trains on two curves prepared at the previously mentioned step S3 to thereby determine the point train of the intermediate shape. In more detail, the processing shown in flowchart of FIG. 15 is carried out to thereby generate the intermediate curve indicating the intermediate shape when there takes place the change from the contour shape that the first contour curve A indicates to the contour shape that the second contour curve B indicates. In accordance with the flowchart of FIG. 15, first, at step S31, the point train corresponding to the first contour curve A and the point train corresponding to the second contour curve B which are determined by resampling processing of the step S3 of FIG. 10 are inputted from the data memory 4. Further, there are designated sampling points at positions corresponding to correspondence points on the point train corresponding to the first contour curve A and the point train corresponding to the second contour curve B from the correspondence points. At the subsequent step S32, when the time at which interpolation of the two curves is carried out is assumed to be T with respect to the point train consisting of the sampling points, the coordinate of point on the first contour curve A is assumed to be a, and the coordinate of point on the second contour curve B corresponding to the coordinate a is assumed to be b, coordinate C of the point at the intermediate curve indicating the intermediate shape to be determined is expressed by the following formula (2).

$$C = T \cdot a + (1-T) \cdot b \quad (2)$$

Namely, by applying the above-mentioned formula (2) to the point trains corresponding to the first and second contour curves, the coordinate of the sampling points constituting intermediate curve is determined from the sampling points corresponding to the first contour curve A and the sampling points corresponding to the second contour curve B corresponding to the sampling points corresponding to the first contour curve A. At the subsequent step S33, processing for designating the next sampling points of the sampling points where the formula (2) is applied at the above-described step S32 is carried out with respect to the point train corresponding the first contour curve A and the point train corresponding to the second contour curve B. At the subsequent step S34, the arithmetic processing unit 2 judges whether or not the correspondence point returns to the correspondence point where generation processing of the intermediate curve is started at the above-described step S31 as the result of the fact that the next sampling point is designated at the above-described step S33. Further, when it is judged that the correspondence point returns to the correspondence point, the processing proceeds to step S35. On the other hand, when it is judged that the correspondence point does not return to the correspondence point, the processing which has been explained at the step S32 is carried out with respect to the sampling points designated at the step S33. Namely, the processing which has been explained at the step S32 is carried out with respect to all of the sampling points set at the above-described sampling processing of the step S3 to thereby determine the coordinate of points at the intermediate curve in accordance with the above-mentioned formula (2). At step S35, by using the sampling points determined at the above-described step S3 and coordinate C of the point at the intermediate curve determined at the step S32, the technology shown in the Japanese Patent Application Laid Open No. 164436/1998 publication or "An Algorithm for Automatically Fitting Digitized Curves" (pp. 612–626) in the "Graphics Gems" (Andrew S. Glassner) is applied to thereby transform (convert) the point train consisting of the sampling points into the Bezier curve. Thus, the curve is reconstructed from the point train consisting of the sampling points corresponding to first contour curve A and the point train consisting of the sampling points corresponding to the second contour curve B to generate the intermediate curve indicating the intermediate shape when the change from first contour curve A to the second contour curve B takes place as shown in FIG. 9.

The curve generating apparatus 1 for carrying out such an intermediate curve generation processing is adapted so that when, as shown in FIG. 8, the intermediate curve when there takes place the change from the first contour curve A to the second contour curve B is generated, even if the numbers of the segments of the first contour curve A and the second contour curve B are different from each other, the first and second contour curves are caused to undergo sampling to set the same number of sampling points with respect to the first contour curve A and the second contour curve B to reconstruct the curve. Accordingly, it is possible to generate intermediate curve group Zc as shown in FIG. 9 with high quality and simply.

Figure 16:
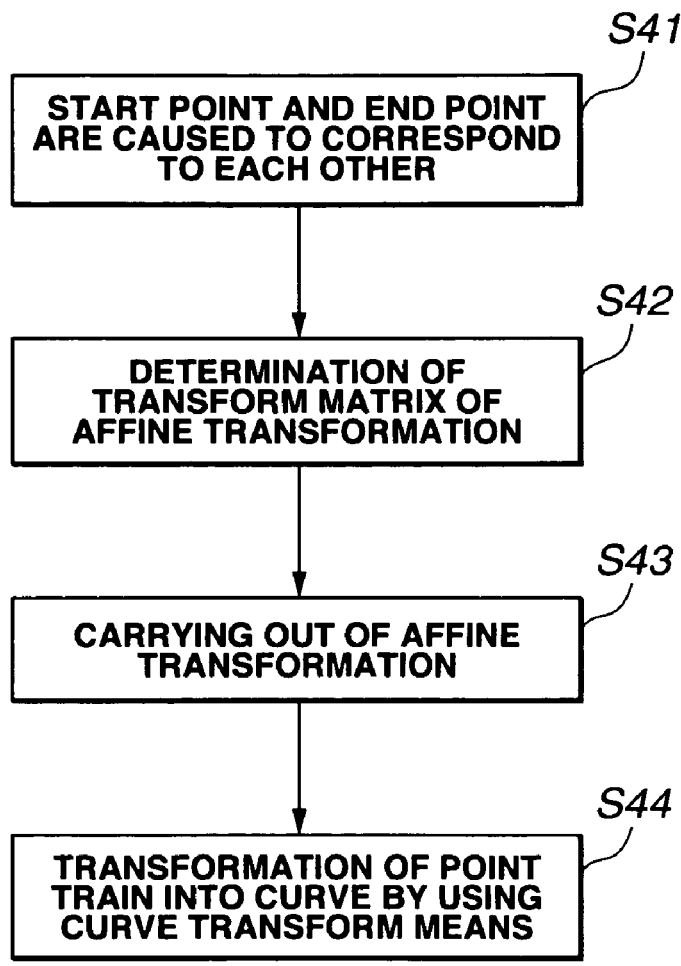
FIG. 16 is a flowchart for explaining the processing procedure for deforming the interpolated shape in correspondence with reference correspondence points.

Then, at step S104 of FIG. 6, the interpolated shape determined at step S103 is deformed in correspondence with reference correspondence points determined at the step S102. Explanation will be given with reference to FIGS. 16, 17 and 18 with respect to such an operation. FIG. 16 is the detail of deformation processing of the step S104, FIG. 17 is a view used for explanation from the start START up to the step S42 thereof, and FIG. 18 is a view used for explanation from the step S43 up to the end END.

Figure 17:
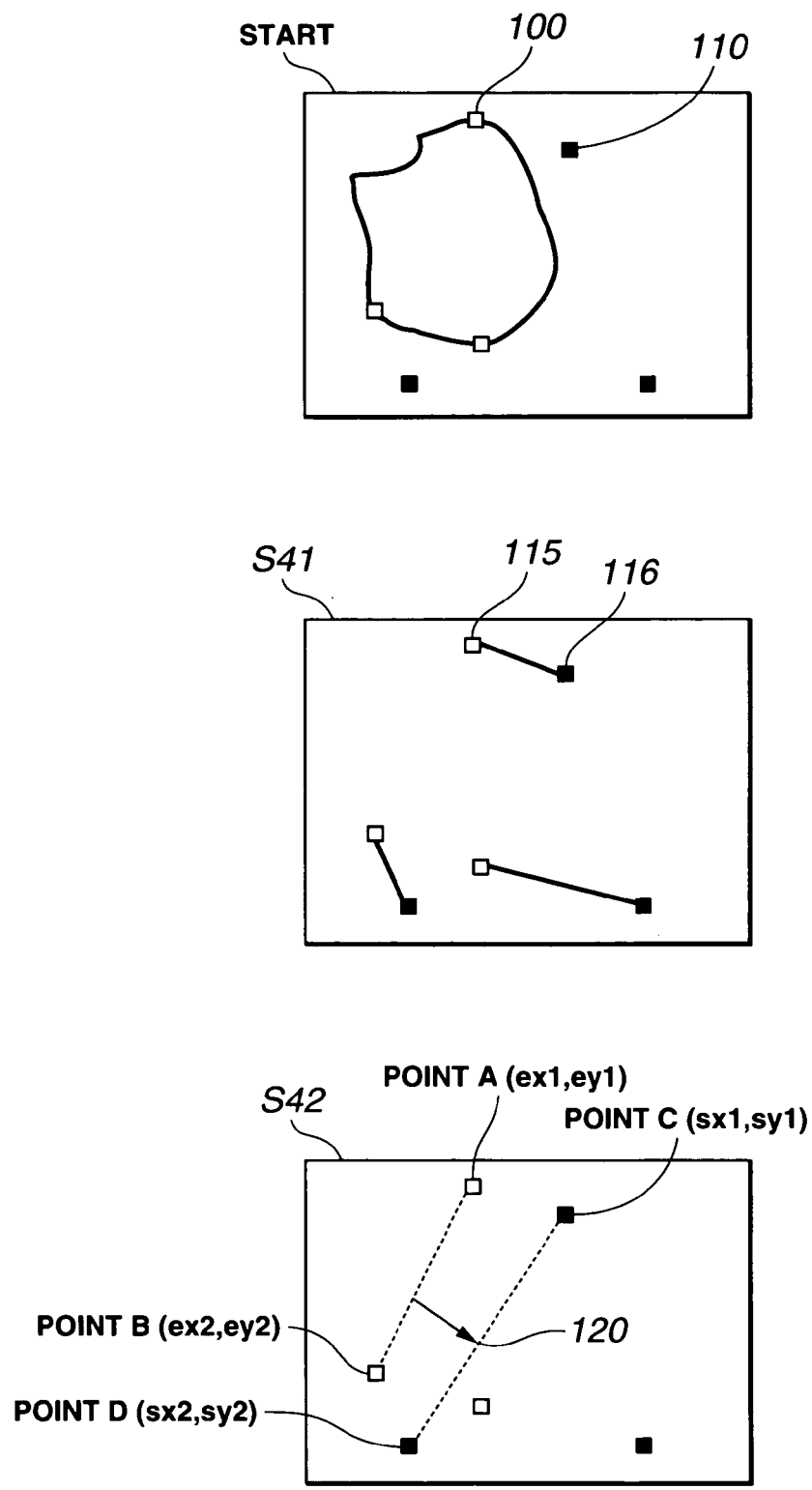
FIG. 17 is a view showing a more practical example of processing up to step S42 of the flowchart shown in FIG. 16.

First, at step S41 of FIG. 16, start point 115 and end point 116 are caused to correspond to each other with respect to reference correspondence points 110 indicated at START of FIG. 17 determined by image pursuit processing of the step S102 of FIG. 6 and reference correspondence points 100 indicated at START of FIG. 17 determined at the intermediate shape preparation processing of the step S103. It is now assumed that the coordinates of the start points at the step S103 are A (ex1, ey1) and B (ex2, ey2) and coordinates of the end points at the step S102 are C(sx1, sy1) and D(sx2, sy2). At the step S42, such a coordinate transformation (conversion) to convert line segment AB into line segment CD is determined. Such a transformation can be represented by combination of parallel displacement and rotation, and operation of scaling. Such a transformation is called affine transformation 120.

The transform formula of the affine transformation is as follows.

With respect to the method of transforming point (x, y) into point (x', y') by the affine transformation, the following relational expression is assumed to hold.

$$[x'] = sc*[\cos\theta - \sin\theta][x-ex1] + [sx1]$$

$$[y'] = sc*[\sin\theta - \cos\theta][y-ey1] + [sy1]$$

In the above formula, sc=L1/L2
L1=$\sqrt{((sx2-sx1)^2+(sy2-sy1)^2)}$
L2=$\sqrt{((ex2-ex1)^2+(ey2-ey1)^2)}$
θ=θ2−θ1
θ1=a tan 2 ((sy2−sy1)/L1, (sx2−sx1)/L1)
θ2=a tan 2 ((ey2−ey1)/L1, (ex2−ex1)/L2)

Then, at the step S43, the affine transformation determined at the step S42 is calculated with respect to the point train constituting the intermediate shape determined at the step S102 of FIG. 6. As a result, as shown in FIG. 18, there is prepared the shape which holds the feature of the intermediate shape determined at the step S103 and passing through the end point determined at the step 102. Then, at step S44, by using the method of transforming (converting) the point train determined at step S43 into the previously described Bezier curve, transformation into the curve is carried out. By carrying out such a processing with respect to all sections of the shape, it becomes possible to transform the shape prepared at the intermediate shape preparation processing of the step S103 into the shape passing through reference correspondence points prepared at the step S102.

As described above, in accordance with this invention, in preparing the intermediate shape of the two curves, it becomes possible to prepare the intermediate shape passing through designated reference correspondence points. In addition, it is possible to set a reference correspondence point at the precise position by image pursuit processing. As a result, it has become possible to prepare, with high precision, the intermediate shape determined at the picture image designated on the time axis. Thus, positional shift between the shape by linear interpolation and the actually determined shape which was the problem of the prior art can be solved.

Figure 19:
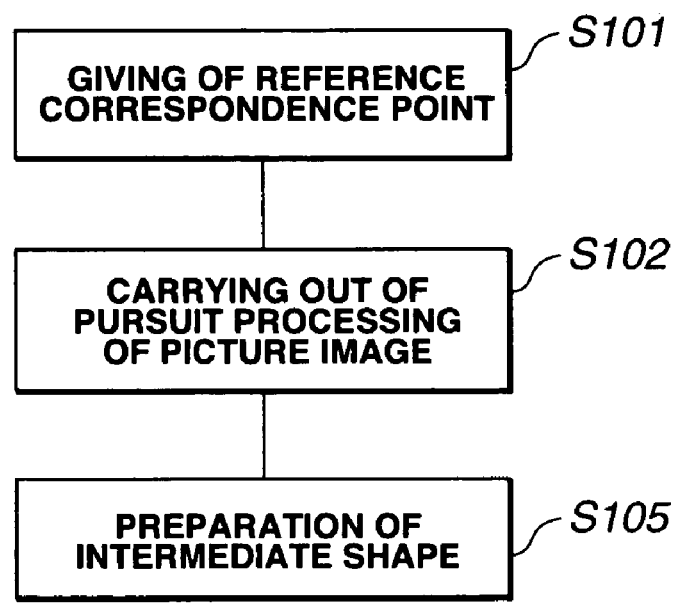
FIG. 19 is a flowchart for explaining operation of another more practical example of this invention.

Another more practical example of this invention will now be described. In FIG. 19, there is shown the example in which the step S103 is omitted among the condition of the first embodiment shown in FIG. 6 and the portion of the step S104 is realized by another method as step S105.

Edge information of the picture image is used as substitutive means for preparing the intermediate shape to carry out processing for automatically generating the shape passing through the reference correspondence point and along the edge. In a more practical sense, as a method of detecting the optimum path passing through the designated point, there is used the technology of the path search method disclosed in the Japanese Patent Application No. 204862/1997 by the applicant of this application.

Explanation will be first given in connection with curve generating means which generates the curve by the path search method disclosed in the Japanese Patent Application No. 204862/1997.

Figure 20:
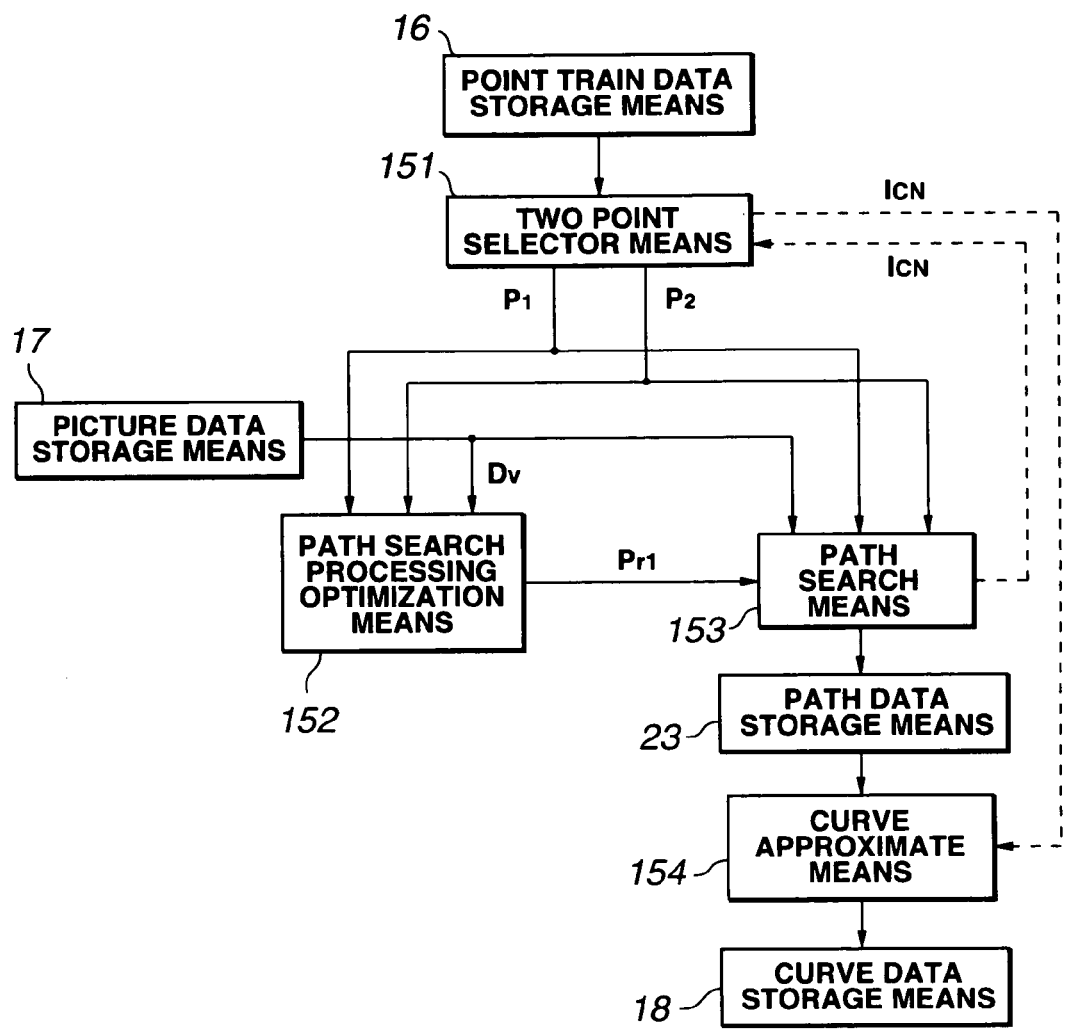
FIG. 20 is a block diagram showing an example of the configuration of the main part of the curve generating means for generating the curve by the more practical example of the path search method.

FIG. 20 is a block diagram showing the curve generating means. The curve generating means is composed of respective processing means composed of two point selector means 151, path search processing optimization means 152, path search means 153 and curve approximate means 154, and respective data stores (storages) 16, 17, 23, 18 for the point train, picture image, path and curve.

The two point selector means 151 selects successive two points $P_1$, $P_2$ from the point train data storage means 16 to output them. The path search processing optimization means 152 calculates path search parameter $P_{r1}$ for optimizing the path search method from the selected two points $P_1$, $P_2$ and picture image data $D_V$ from the picture data storage means 17 to send it to the path search means 153.

The path search means 153 determines the path search processing method on the basis of the path search parameter $P_{r1}$ that the path search processing optimization means 152 has calculated to calculate path data connecting the selected two points $P_1$, $P_2$ and passing on the contour within the picture image to hold it by the path data storage means 23.

In this case, the path data is a list of pixel coordinates indicating eight vicinity graphics connecting the above-mentioned two points. As indicated by broken lines in FIG. 20, the path search means 153 sends control information $I_{CN}$ to the two point selector means 151 to select the next two points. Accordingly, path searches are carried out with respect to portions between respective points of the point train storage means 16 so that all the search data are accumulated (stored) into the path data storage means 23.

When the two point selector means 151 has selected until the last of the point train to fail to output new two points, it sends control information $I_{CN}$ to the curve approximate means 154 as indicated by broken lines in FIG. 20 to hasten the operation of the curve approximate means 154. The curve approximate means 154 carries out curve approximation of the path stored in the path data storage means 23 to prepare curve data indicating the contour shape to hold it by the curve data storage means 18.

Explanation will now be given with reference to FIGS. 21 and 20 in connection with the path search method that the curve generating means executes.

Figure 21:
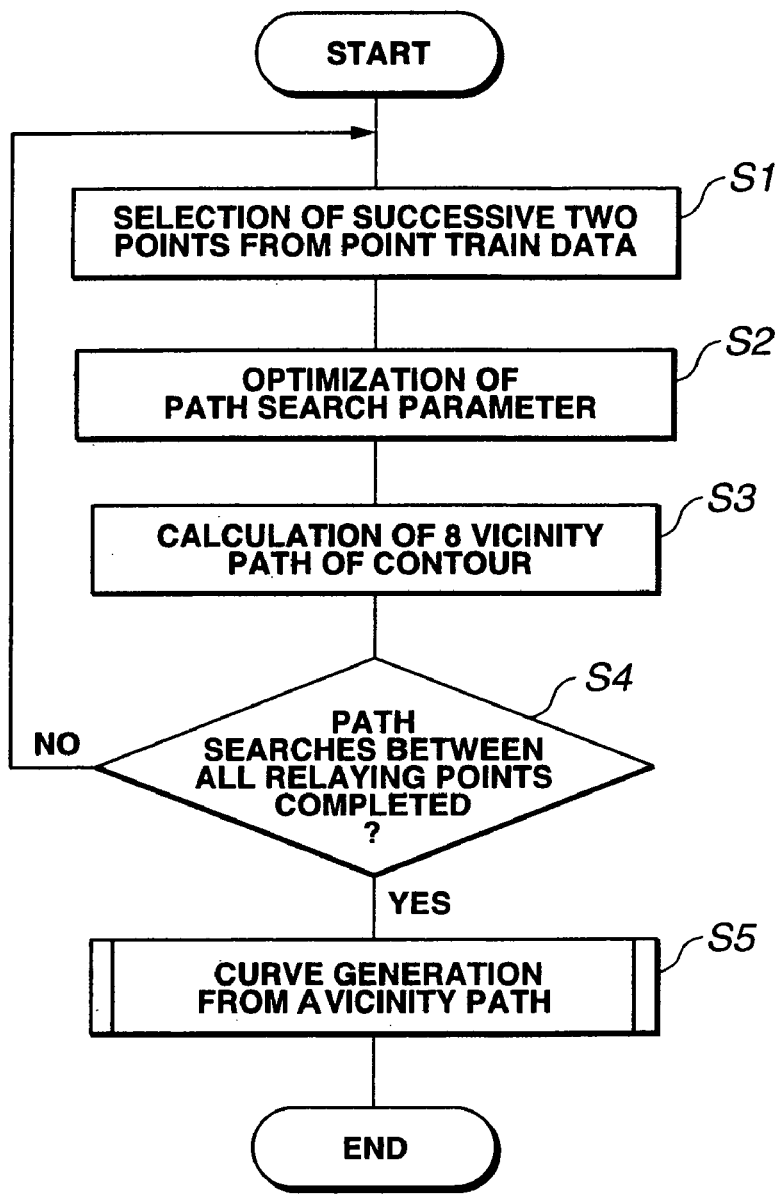
FIG. 21 is a flowchart showing the basic processing procedure of the path search method.

FIG. 21 is a flowchart showing the fundamental processing procedure of the path search method according to this invention. First, at step S1, the two point selector means 151 selects successive two points from the point train data storage means 16 to output them.

Then, at step S2, optimization of the path search parameter is carried out. Path search parameter $P_{r1}$ is calculated by the path search processing optimization means 152 on the basis of the two points $P_1$, $P_2$ selected by the two point selector means 151 and picture data Dv.

Then, at step S3, the path search is carried out. The path search means 153 determines the path search method on the basis of the path search parameter obtained at the second step S2 to extract the contour connecting the above-mentioned two points in the form of a vicinity path.

Further, at step S4, there is carried out judgment as to whether or not path searches between all relaying (repeating) points have been completed. As a result, if such path searches have not yet been completed, the processing returns to step S1 to select two points in which one point is shifted from the two points selected at last time to repeat steps S2, S3. On the other hand, when it is judged at step S4 that path searches between all relaying points have been completed, the processing proceeds to step S5.

At the step S5, the contour curve which approximates the vicinity path is generated to complete the processing. The curve approximate means 154 carries out curve approximation of the path data stored in the path data storage means 23 to prepare curve data indicating the contour shape.

In this case, the curve approximate means 154 can be realized by the technology in which the applicant of this application has disclosed "Curve Generating Apparatus and Curve Generating Method" in the Japanese Patent Application Laid Open No. 303687/1996 publication. This technology is a method of obtaining a curve which approximates a coordinate list and is one of the so-called curve approximation methods. Namely, this method is a method of approximating the order of input data while dividing it within the sufficiently approximatable range so that this method is robust to noise and has good efficiency as compared to the conventional curve approximations.

However, the above-mentioned curve approximation means 154 may be methods of curve-approximating a series of coordinate lists, and may be realized by a method of generating a B-spline curve generally used, etc.

It is to be noted that general curve approximation/interpolation methods are described in detail in articles such as "Numerical Calculation Handbook" (Yutaka Ohno, Kazuo Isoda, Ohm Company, 1990), "Shape Processing Engineering [I] [II] by Computer Display" (Fujio Yamaguchi, Nikkan Kogyo Shinbun Sha, 1982, "Computer Graphics Principles and Practice" (Foly, VanDam, Feiner, and Hughes, Addison Wesley Company, 1990), etc.

The path search processing optimization means 152 and the path search means 153 will now be described in more detail.

Figure 22:
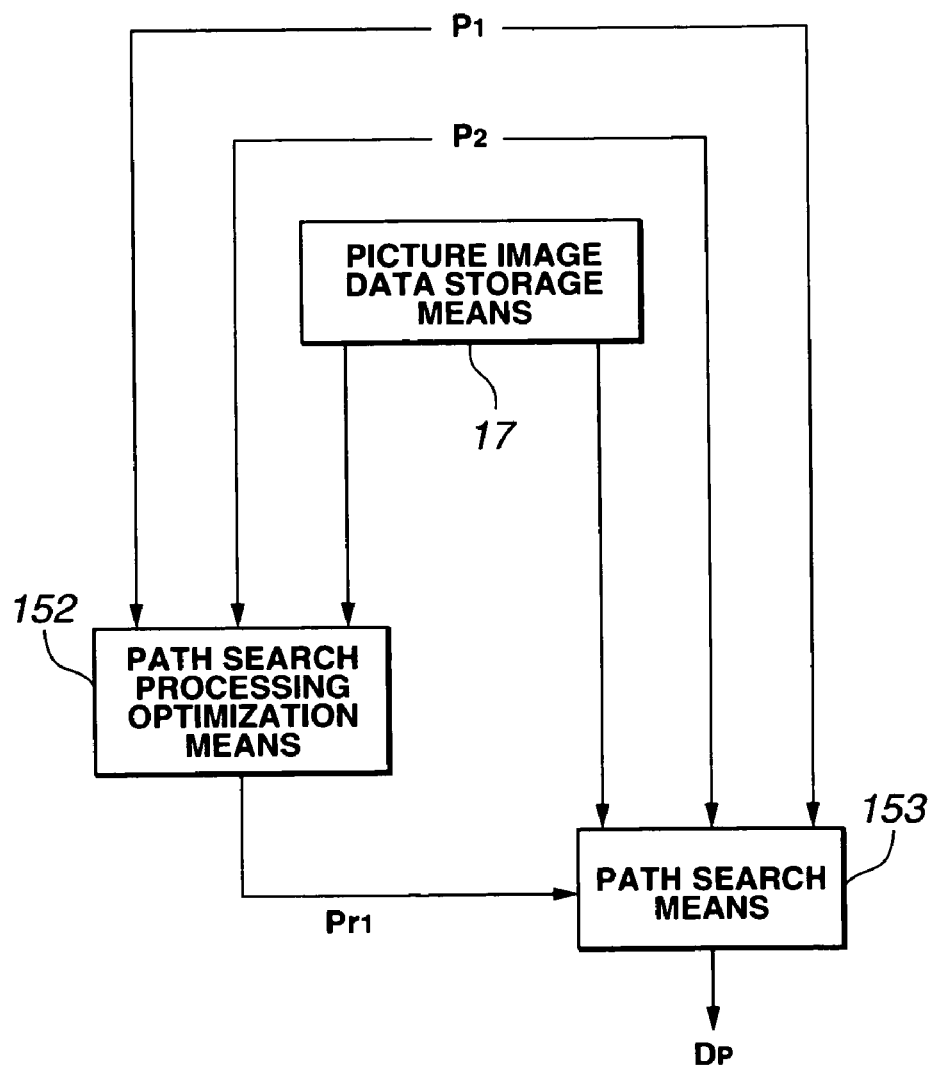
FIG. 22 is a view for explaining processing for carrying out the path search on the basis of the path search method.

FIG. 22 is a block diagram in which the portion for carrying out the path search is extracted of the curve generating means. The feature of the curve generating means for carrying out this path search resides in that the path search processing optimization means 152 is provided to thereby carry out the path search processing optimized with respect to inputted two points. In this example, the path search processing optimization means 152 is adapted to output two kinds of path search parameters $P_{r2}$ and $P_{r3}$ which will be described later.

Figure 23:
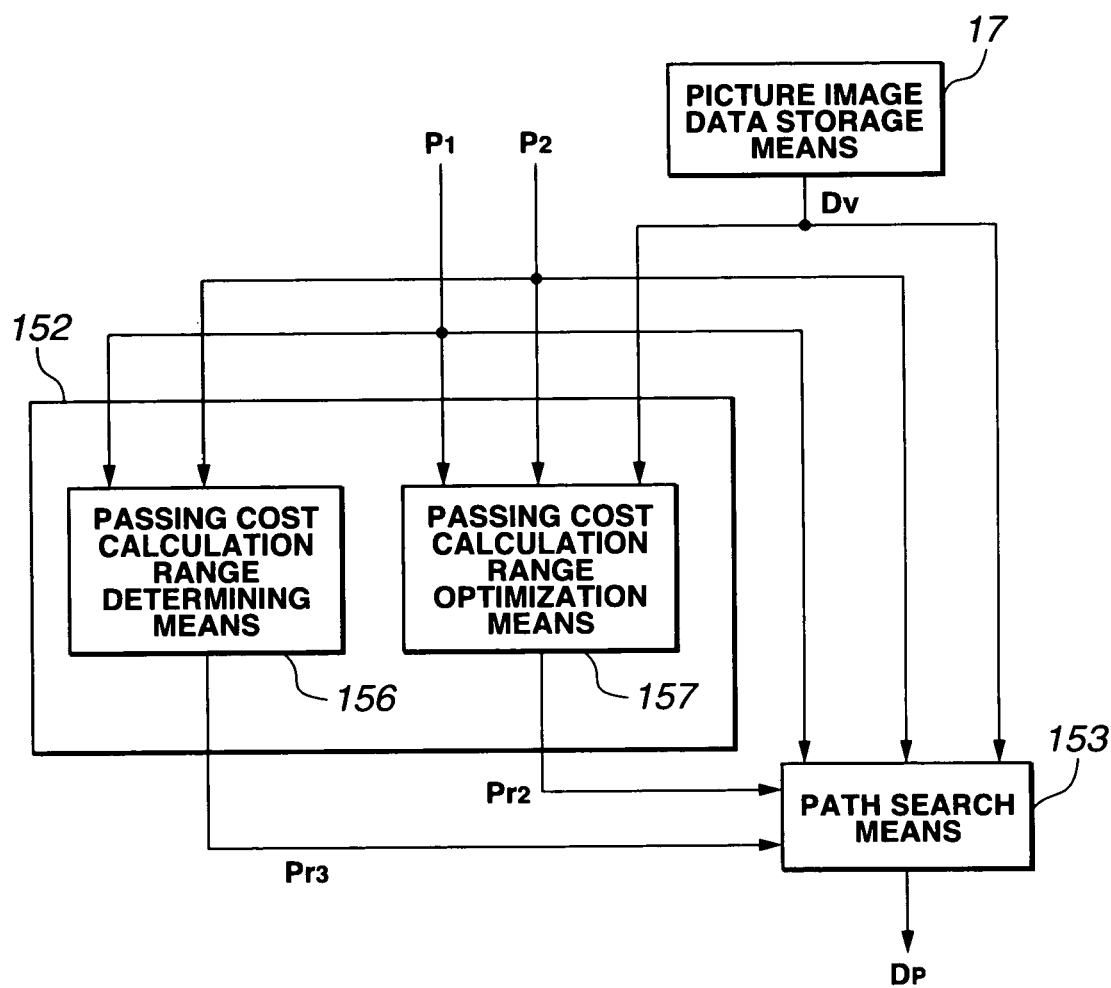
FIG. 23 is a view for explaining the internal configuration of the path search processing optimization means.

FIG. 23 shows the internal configuration of the path search processing optimization means 152. The path search processing optimization means 152 is composed of passing cost calculation range determining means 156 and passing cost calculation optimization means 157. The passing cost calculation range determining means 156 inputs selected two points $P_1$, $P_2$ to output calculation range parameter $P_{r3}$. Further, the passing cost calculation optimization means 157 outputs passing cost calculation parameter $P_{r2}$ from the selected two points $P_1$, $P_2$ and picture data $D_v$. In addition, these two kinds of path search parameters $P_{r2}$ and $P_{r3}$ are inputted to the path search means 153 and are used for determining the path search method.

Figure 24:
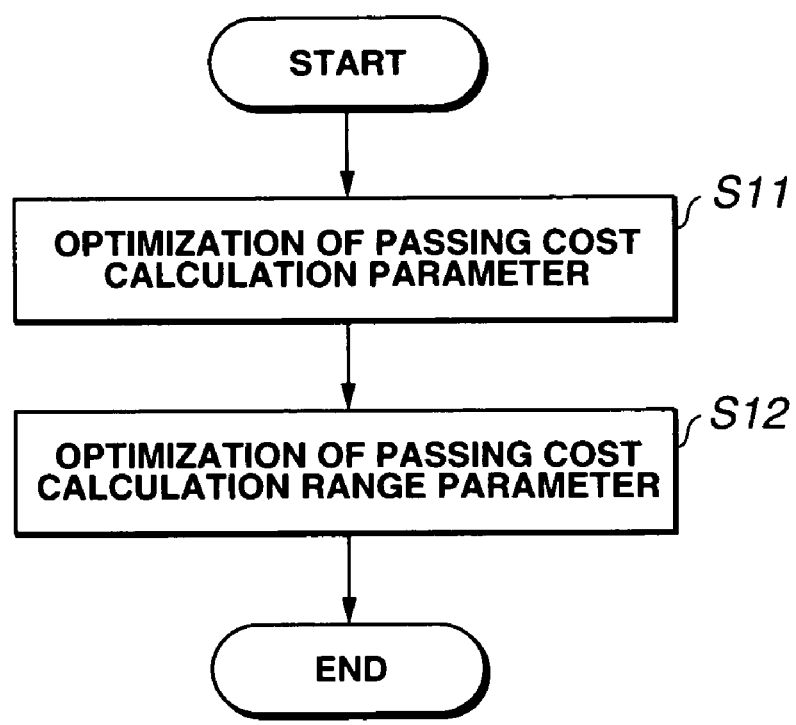
FIG. 24 is a flowchart for explaining the processing procedure in the path search processing optimization means.

FIG. 24 is a flowchart showing the processing procedure at the path search processing optimization means 152.

First, at step S11, optimization of the passing cost calculation parameter is carried out. Namely, the passing cost calculation optimization means 157 calculates passing cost calculation parameter $P_{r2}$ from the selected two points (point $P_1$ and point $P_2$) and picture image data $D_v$. Then, at step S12, optimization of the passing cost calculation range parameter is carried out to complete the processing. Namely, the passing cost calculation range determining means 156 inputs the selected two points $P_1$, $P_2$ to calculate passing cost calculation range parameter $P_{r3}$.

Figure 25:
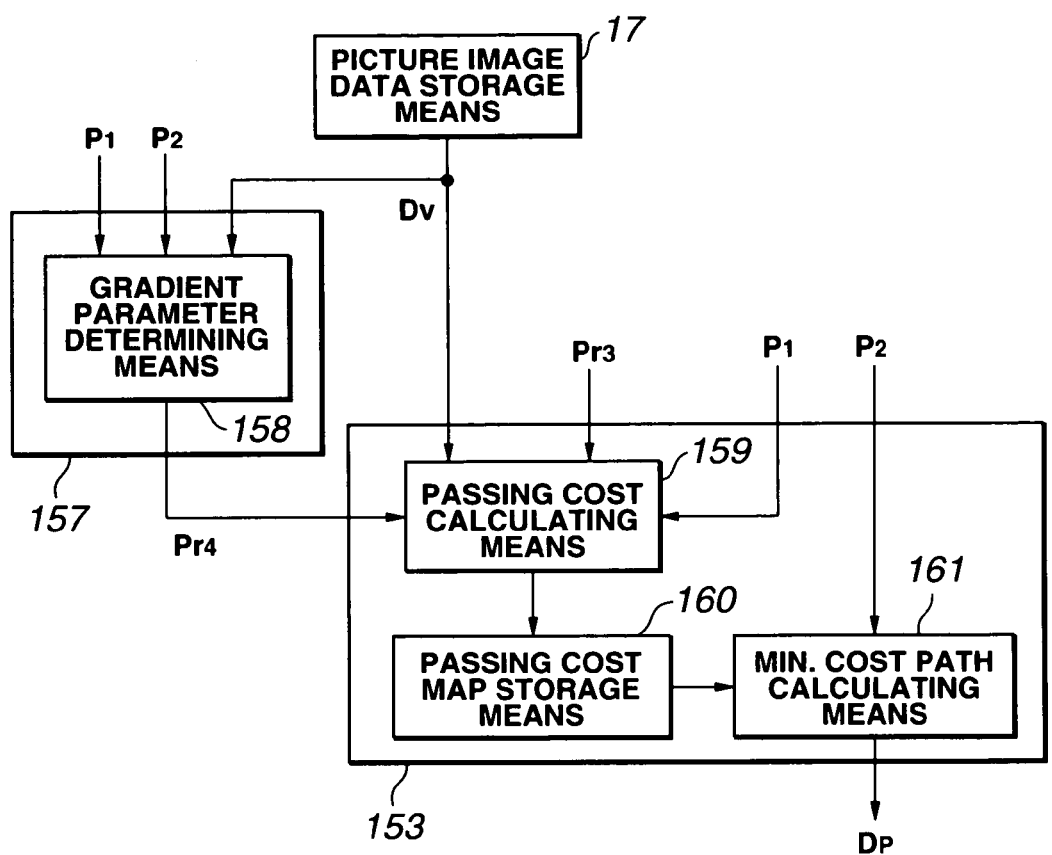
FIG. 25 is a view for explaining the processing relating to the passing cost calculation parameter of the path search processing optimization means.

FIG. 25 is a block diagram showing, in more detail, the portion for carrying out processing relating to passing cost calculation parameter $P_{r2}$ in FIG. 23.

The passing cost calculation optimization means 157 is caused to be of a configuration comprising gradient parameter determining means 158.

Moreover, the path search means 153 is caused to be of a configuration comprising passing cost calculation means 159, minimum cost path calculating means 161, and passing cost map storage means 160 for storing data called a passage cost map which will be described later.

The gradient parameter determining means 158 inputs picture data $D_v$ and two points $P_1$, $P_2$ to calculate gradient parameter $P_{r4}$ (a sort of passing cost calculation parameter) optimum for extracting contour between the two points to output it to the passing cost calculating means 159 of the path search means 153.

The passing cost calculating means 159 inputs picture data $D_v$, the point $P_1$, the gradient parameter $P_{r4}$, and calculation range parameter $P_{r3}$ that the passing cost calculation range determining means 156 shown in FIG. 23 outputs to calculate passing cost map to output it to the passing cost map storage means 160.

The minimum cost path calculating means 161 inputs passing the cost map from the passing cost map storage means and the point $P_2$ to calculate path data $D_p$ connecting the points $P_1$ and $P_2$ so as to trace the contour therebetween.

Figure 26:
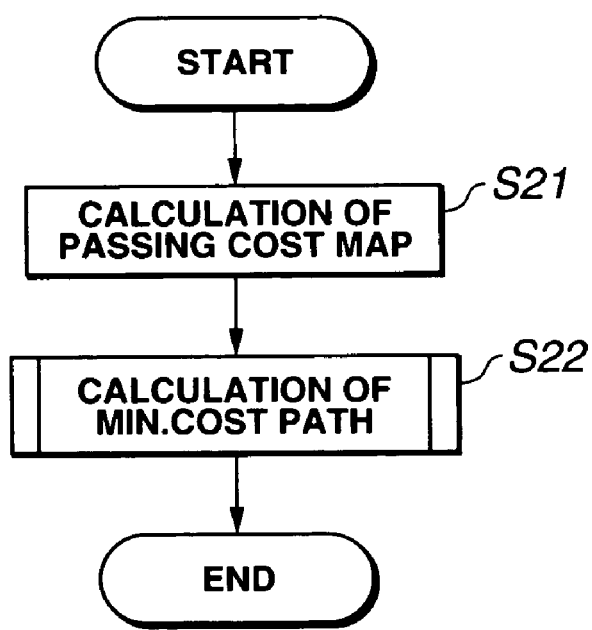
FIG. 26 is a flowchart for explaining the processing procedure in the path search means.

FIG. 26 is a flowchart showing the processing procedure at the path search means 153.

First, at step S21, the passing cost calculating means 159 calculates the passing cost map. Then, at step S22, the minimum cost path calculating means 161 calculates the minimum cost path. The detail of this operation will be described later.

Figure 27:
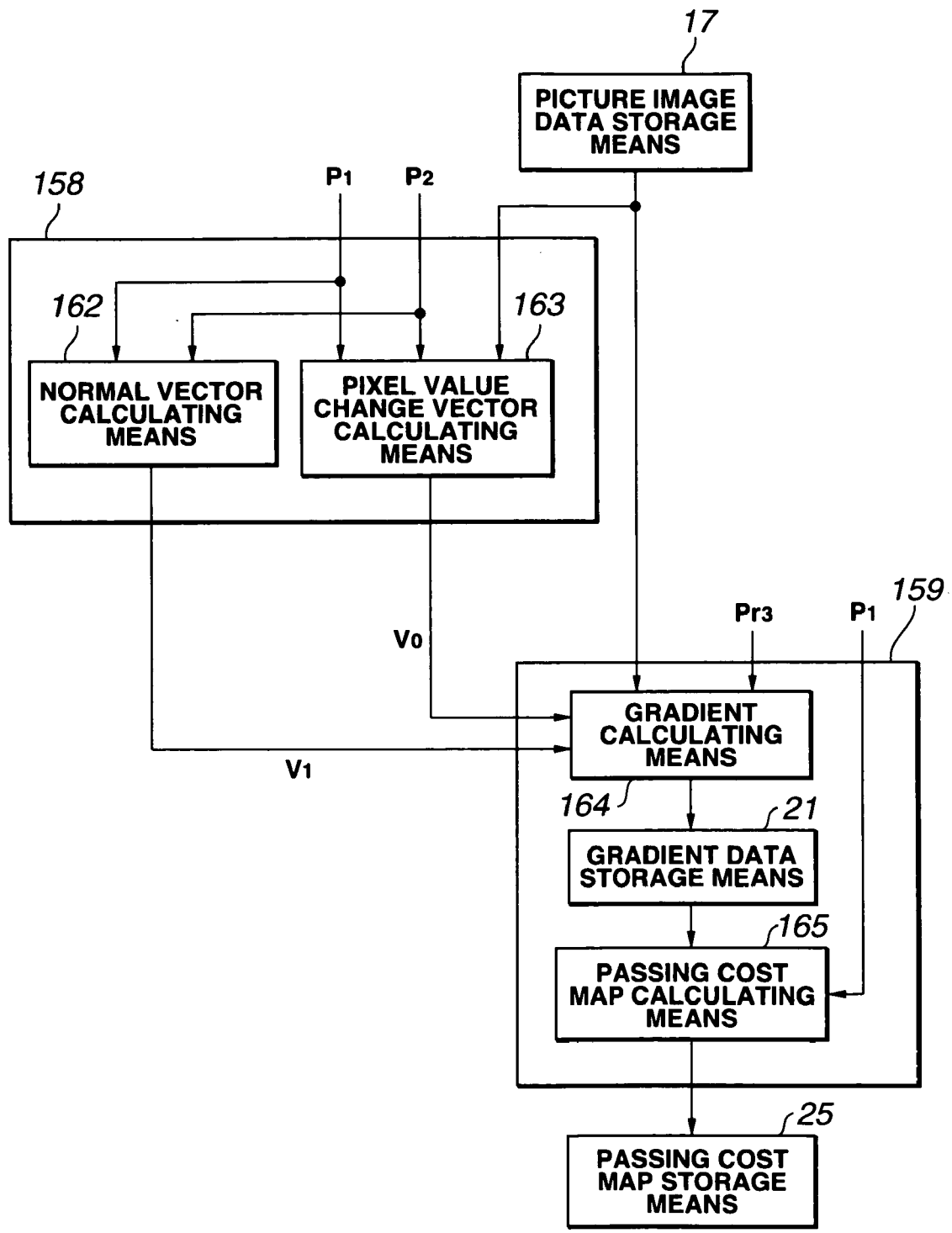
FIG. 27 is a view for explaining, in detail, processing relating to the passing cost calculation parameter utilizing selective gradient detection.

FIG. 27 shows, in more detail, the configuration of the portion for carrying out processing relating to the above-described passing cost calculation parameter.

The passing cost calculation parameter $P_{r2}$ is two kinds of parameters necessary in calculating the gradient of the picture image. The first parameter is normal vector $V_1$ indicating the direction perpendicular to the advancing direction of the contour, and the second parameter is pixel value color change vector $V_0$ indicating the change of pixel value when observed in a direction traversing the contour.

Moreover, the path search means 153 carries out a processing to extract, by utilizing the fact that the object contour has high gradient strength, such a path on the picture image to pass as close as possible the portion having higher gradient strength.

In order to carry out processing as described above, the pass cost calculating means 159 is composed of gradient calculating means 164, passing cost map calculating means 165 and gradient data storage means 21.

The gradient calculating means 164 calculates the gradient of the picture image. The passing cost map calculating means 165 calculates passing cost map such that when the path is passed through the portion where gradient strength is higher, cost is reduced to more of a degree on the basis of the gradient thus obtained. Position of the point $P_1$ is inputted to the passing cost map calculating means 165 and starting point of the passing cost map is set at the point $P_1$.

In this example, the gradient calculating means 164 selectively detects only a gradient component of the necessary contour by using the technology in which the applicant of this application has disclosed in "Edge Detection Method and Edge Detection Apparatus" in the Japanese Patent Application Laid Open No. 134420/1995 publication. By this gradient calculating means 164, the gradient is calculated so as to selectively extract the gradient of the contour extending in a manner connecting the inputted two points.

Explanation will now be given in detail in connection with the calculation process of the above-described two kinds of path search parameters.

Figure 28:
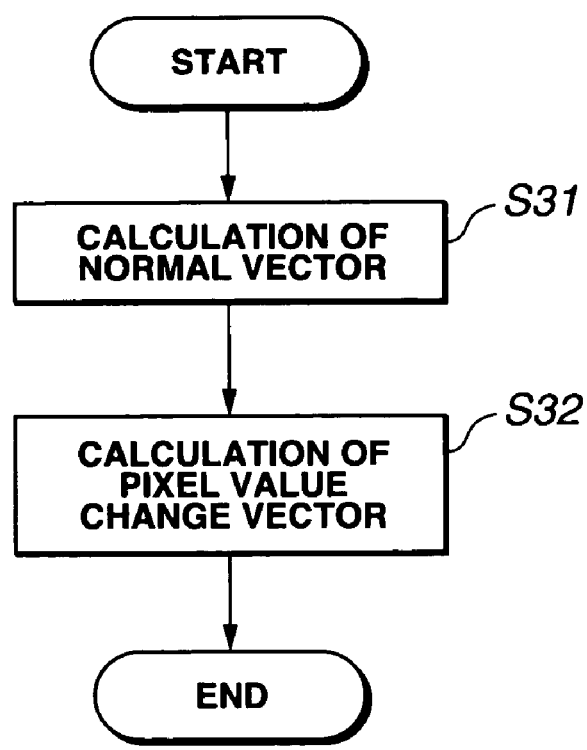
FIG. 28 is a flowchart for explaining the processing procedure in the passing cost optimization means.

First, calculation of passing cost calculation parameter $P_{r2}$ and the process where such parameter is utilized will be described. FIG. 28 is a flowchart showing the processing procedure at the gradient parameter determining means 158. At step S31, normal vector calculating means 162 calculates normal vector $V_1$ perpendicular to the direction connecting inputted points $P_1$ and $P_2$ to output it. At step S32, pixel value change vector calculating means 163 calculates the change of pixel value of the picture image when observed in a direction perpendicular to the direction connecting two points, e.g., the color change direction in the neighboring region of the points $P_1$ and $P_2$ on the picture image to output it as color change vector $V_0$.

In this example, the passing cost map is information in which, in each pixel, the direction admitted to that pixel position at the minimum passing cost is recorded.

FIG. 29 shows an example of a simple passing cost map.

The passing cost map is prepared with respect to one range within the picture image designated by the passing cost calculation range parameter $P_{r3}$. In this example, there is shown an example where such map is prepared in a certain small quadrilateral region.

Figure 29A:
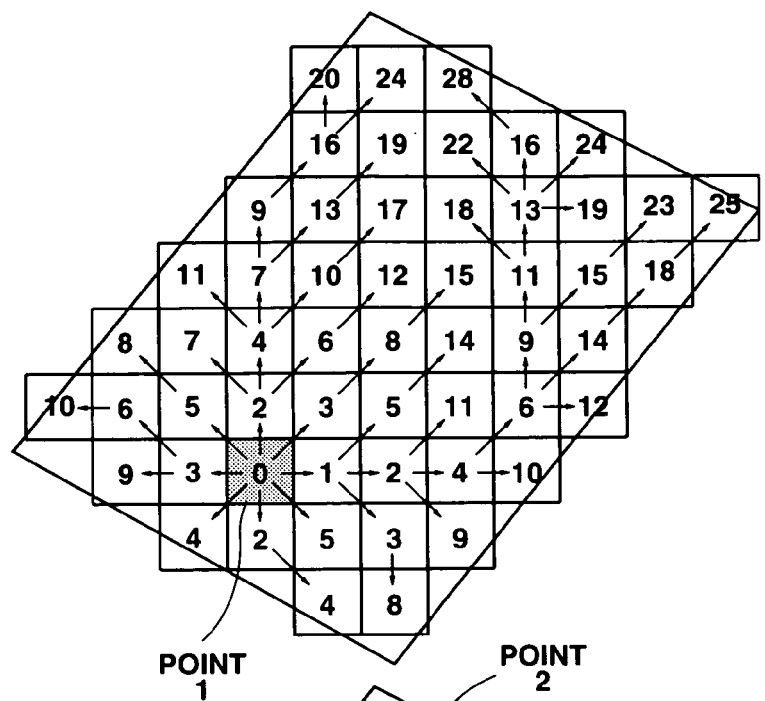
FIG. 29A is a view showing one example of the passing cost map of the path search and FIG. 29B is a view showing the process where the minimum cost path calculation means determines the path when the passing cost map is obtained.

In FIG. 29A, directions admitted to that pixel position at the minimum passing cost in the respective pixels are indicated by an arrow. This direction is calculated so that only one direction is determined in each pixel. The value labeled at each pixel is the accumulated value of the passing cost when admitted in accordance with the minimum passing cost direction. This accumulated value is determined by allowing point POINT 1 serving as the starting point of the path search as accumulated value 0.

Figure 29B:
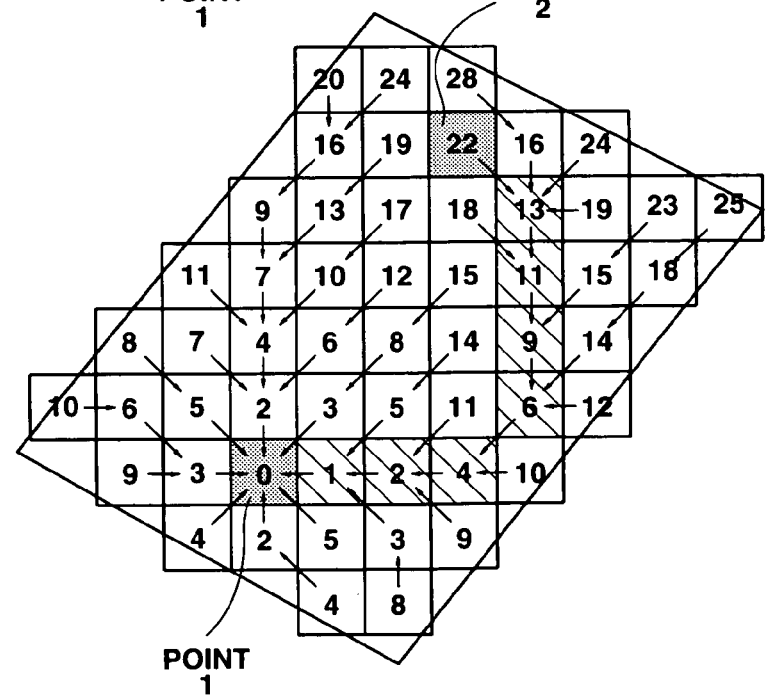

FIG. 29B shows the process where minimum path calculating means 161 determines the path when the passing cost map is obtained as shown in FIG. 29A.

The minimum cost calculating means 161 inputs the passing cost map and the point POINT 2 to trace, in an opposite direction, the minimum passing cost direction of the passing cost map from the point POINT 2 to thereby determine the path of the minimum cost ranging from the point POINT 1 to the point POINT 2. For example, in the case where the point POINT 2 is located at position shown in FIG. 29 B (accumulated cost is 22), the arrows are traced from the point POINT 2 (written in a direction opposite to that in FIG. 29A) to determine the path until the point POINT 1 as indicated by the slanting lines.

Explanation will now be given in connection with means for calculating the passing cost map as described above at a high speed. Calculation of the passing cost map is generally known as a sort of optimization problem, and a method of calculating such a cost map by using dynamic programming, etc. is well known. Also in the previously described article "Intelligent Scissors for Image Composition", a method using dynamic programming is described.

FIG. 30 shows an example of the description relating to the shortest path search algorithm using dynamic programming. It is to be noted that, in this description, signs, etc. are partially changed from the program described in the above-mentioned article "Intelligent Scissors for Image Composition".

Calculation of the calculation range parameter and the process where such parameter is utilized will now be described.

Figure 31:
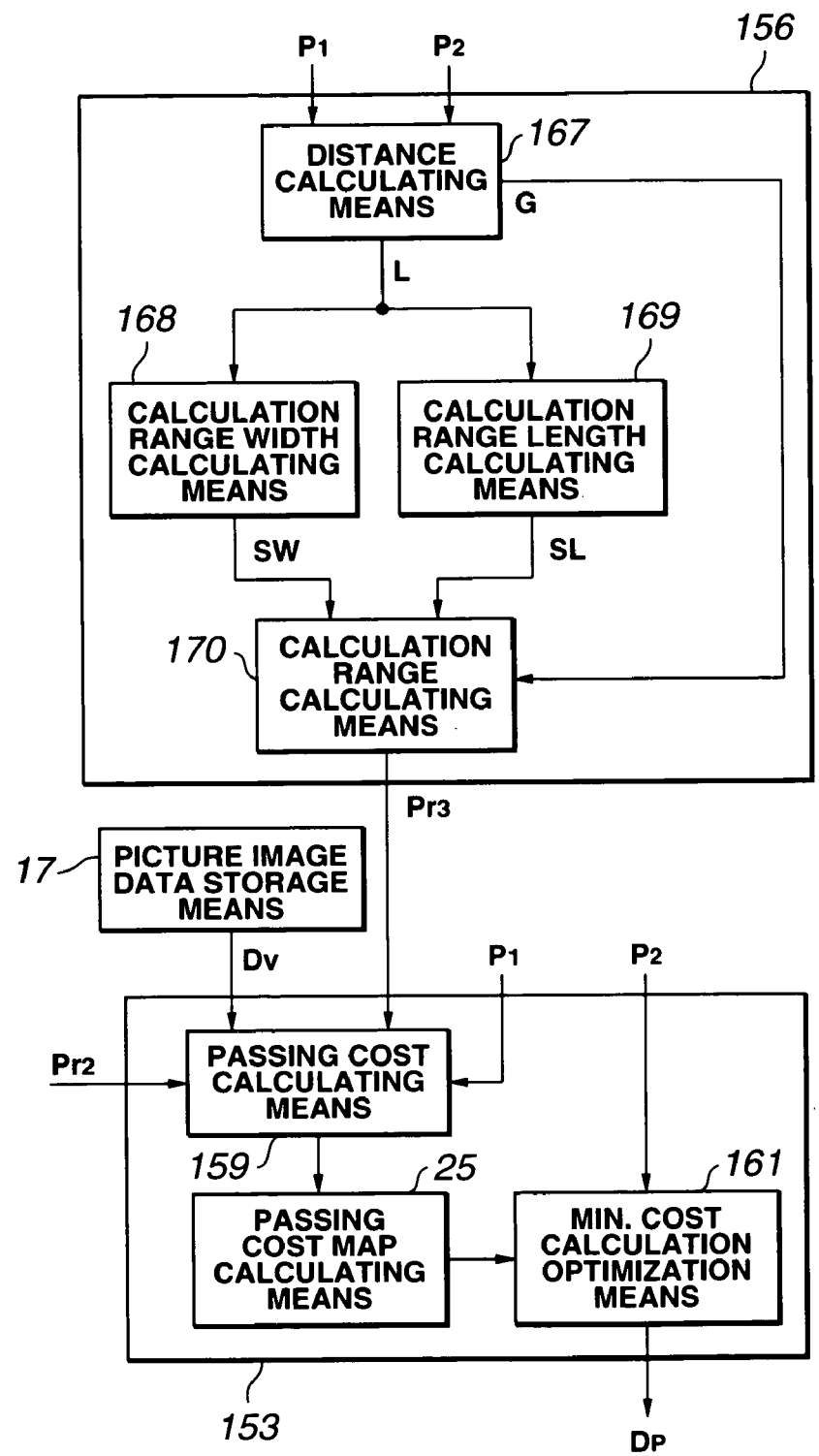
FIG. 31 is a view for explaining in detail processing relating to calculation range optimization of the path search processing optimization means.

FIG. 31 is a block diagram showing, in more detail, the portion for carrying out processing relating to the calculation range parameter in FIG. 23.

The passing cost calculation range determining means 156 is caused to be of a configuration comprising distance calculating means 167, calculation range width calculating means 168, calculation range length calculating means 169, and calculation range calculating means 170.

The distance calculating means 167 inputs points $P_1$, $P_2$ to calculate distance L between the two points and direction G connecting the two points. The calculation range length calculating means 169 inputs the distance L between the two points obtained to calculate calculation range length SL. The calculation range width calculating means 168 inputs distance L between the two points obtained to calculate calculation range width SW. The calculation range calculating means 170 calculates calculation range parameter $P_{r3}$ to determine the shape of the calculation range on the basis of the above-mentioned calculation range length SL, calculation range width SW and direction G connecting two points that the distance calculating means 167 has outputted to input it to the passing cost calculation means 159 of the path search means 153. The passing cost calculation means 159 calculates the passing cost map within the range indicated by the calculation range parameter $P_{r3}$.

Figure 32:
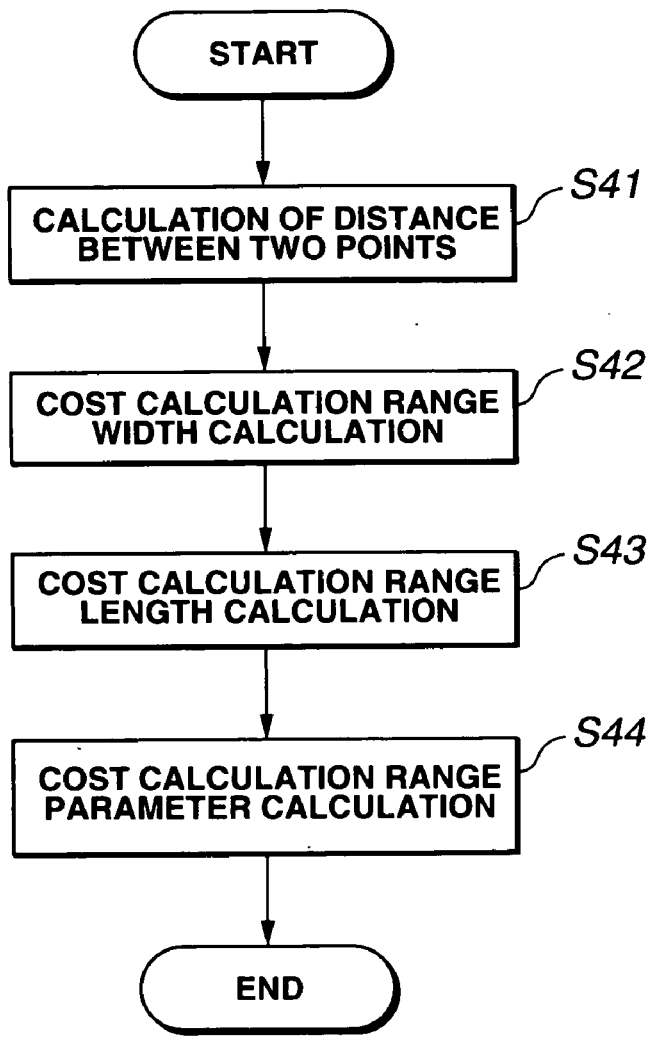
FIG. 32 is a flowchart for explaining the processing procedure in the calculation range optimization means.

FIG. 32 is a flowchart showing the processing procedure at the passing cost calculation range determining means 156 of FIG. 31.

First, at step S41, the distance calculating means 167 inputs points $P_1$ and $P_2$ to calculate distance L between these two points and direction G connecting the two points.

Then, at step S42, the distance L between the two points is inputted. Thus, calculation range width SW is calculated. In this case, the calculation range width calculating means 168 has therein a rule of magnitude (size) of calculation range width SW with respect to magnitude (size) of distance L between the two points in the form such as a calculation formula or reference table, etc. to determine calculation range width SW in accordance with that rule. For example, the problem in which even if the operator attempts to set relaying (repeating) points in detail at short intervals in order to obtain a desired contour, the searched path is meandered between relaying points so that the shape differs from the desired shape of contour can be solved by employing a rule such that the rule for determining calculation range width SW changes to a rule such that as a distance between the two points becomes smaller, the width becomes smaller.

At this time, calculation range width SW between the relaying (repeating) points set in detail at short intervals is set so that it becomes very narrow, and the path search is carried out so that relaying (repeating) points are connected by a substantially straight line. Thus, the contour shape that the operator desires is obtained.

Then, at step S43, the calculation range length calculating means 169 calculates calculation range length SL from distance L between the two points. In this case, the calculation range length SL is determined so that it is larger than the distance L between the two points by the margin length determined in advance.

Finally, at step S44, the calculation range calculating means 170 calculates calculation range parameter $P_{r3}$ from the calculation range width SW, the calculation range length SL and direction G connecting the two points. In this case, the calculation range is such a rectangle to surround the inputted two points $P_1$, $P_2$ and inclined in the direction connecting the two points, and the calculation range parameter $P_{r3}$ indicates the positions of the four corners of that rectangle.

The point train generating means 12 will now be described.

The point train generating means 12 inputs curve C to output the point train reproducing that shape and reconstructed the curve reconstructed by that point train. The point train and the reconstructed curve which have been generated are used for curve editing work which will be carried out later by the configuration of the first embodiment.

Figure 33:
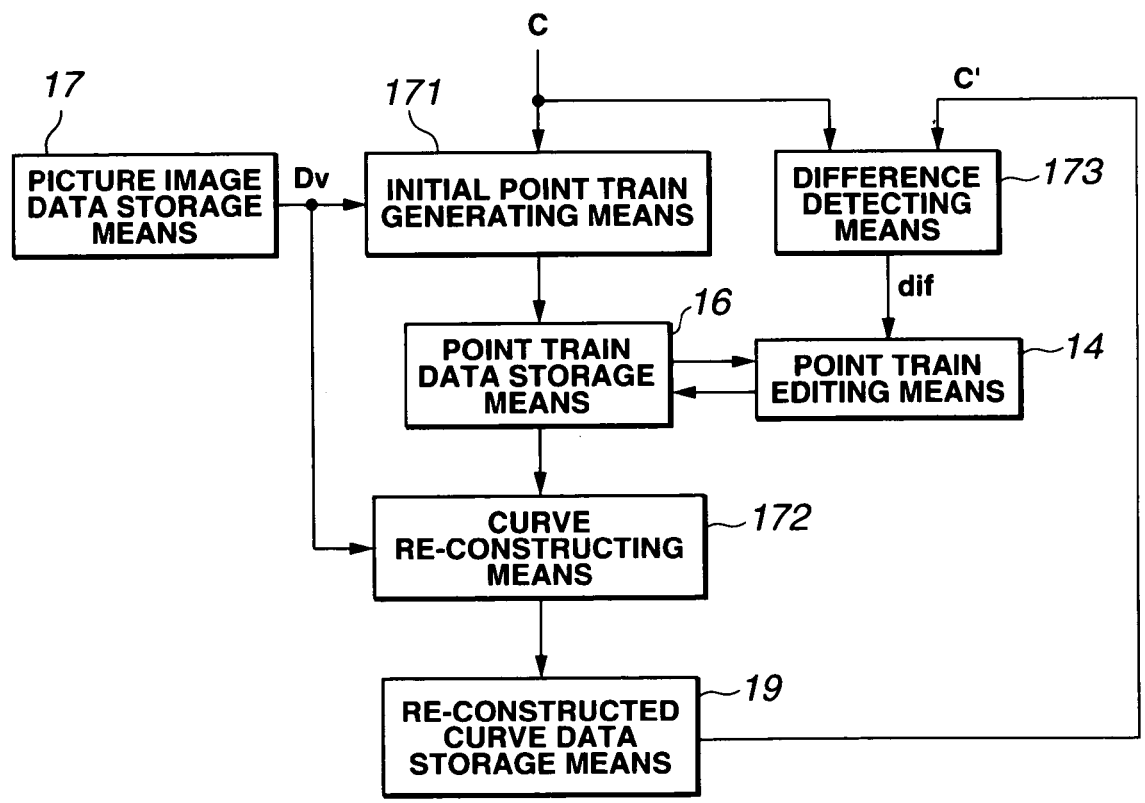
FIG. 33 is a block diagram showing an example of the configuration of the point train generating means.

FIG. 33 is a block diagram showing an example of the configuration of the point train generating means 12.

This point train generating means 12 is caused to be of a configuration comprising initial point train generating means 171, curve reconstructing means 172, difference detecting means 173, point train editing means 14, picture image data storage means 17, point train data storage means 16, and reconstructed curve data storage means 19.

The initial point train generating means 171 inputs input curve C and picture data $D_v$ to generate the initial point train. The point train is stored in the point train data storage means 16. The curve reconstructing means 172 inputs the point train and picture image data $D_v$ to generate such a curve to pass the point train and to pass on the contour of the picture image.

The difference detecting means 173 inputs input curve C and re-constructed curve C' to output the difference between both shapes as difference dif. The point train editing means 14 operates the point train data in the point train data storage means 16 on the basis of difference dif that the difference detecting means 173 has outputted.

Figure 34:
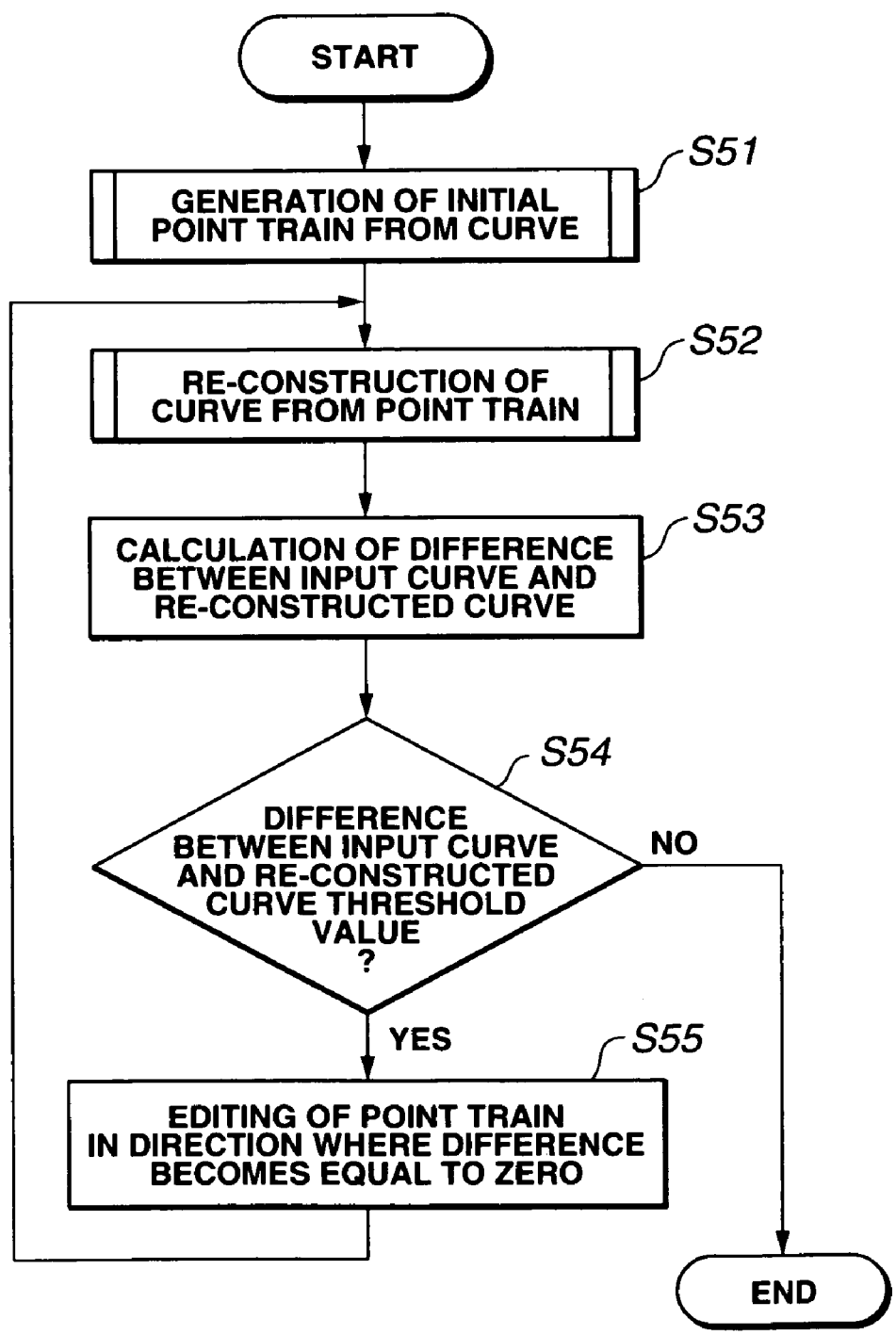
FIG. 34 is a flowchart for explaining the processing procedure in the point train generating means.

FIG. 34 is a flowchart showing the processing procedure in the point train generating means 12.

First, at step S51, the initial point train generating means 171 carries out extraction of feature points of input curve C to store the extracted feature points into the point train data storage means 16 as the initial point train.

For the above-mentioned feature point extraction on the curve, there may be used the feature point extraction method shown in "Motion Vector Estimation Method" described in the Japanese Patent Application Laid Open No. 335270/1996 publication. In accordance with this method, such an approach is employed to calculate very small section bending angles at respective points from the initial end to the terminating end of a curve to allow its sum total to be an accumulated bending angle, whereby when the accumulated bending angle is greater than a threshold value determined in advance, the point which takes the maximum very small section bending angle is caused to be the feature point. Further, similar feature point extraction processing is recursively carried out with respect to the curve divided by the feature points.

Then, at step S52, the curve re-constructing means 172 calculates a re-constructed curve by processing similar to the processing in the previously described path search apparatus according to this invention from the point train.

Then, at step S53, the difference detecting means 173 calculates difference dif between the input curve and the re-constructed curve. In accordance with such difference detection processing, such an approach is employed to take difference detection points at suitable intervals on the re-constructed curve to measure the distance up to the input curve from that difference detection point to allow it to be difference value dif.

Then, at step S54, the difference detecting means 173 examines whether or not there exist difference value dif greater than the threshold value set in advance. If there does not exist a difference value greater than the threshold value, the processing of the point train generating means 12 is completed. Thus, data in the point train data storage means 16 and re-constructed curve data storage means 19 at that time point serve as output. On the other hand, if there exists a difference value greater than the threshold value, the processing proceeds to step S55.

At the step S55, the point train editing means 14 edits point train data on the basis of difference dif thus obtained. At respective difference detection points in which it is judged that the difference value dif is greater than the threshold value, a new relaying (repeating) point is placed at the point on the input curve nearest from that difference detection point to store the point train data into the point train data storage means 16.

After completion of the step S55, the processing returns to the step S52. Thus, at step S54, processing is repeated until difference between input curve C and re-constructed curve C' becomes smaller than the threshold value.

While, in the above-mentioned processing, the number of points constituting the initial point train is set to a lesser value at first to suitably supplement initial points at the shortage portions, there may be employed a method in which the number of points constituting the initial point train is set to a larger value to delete unnecessary points. In that case, such an approach may be employed to generate the initial point train to such a degree that the input curve can be sufficiently polygon-approximated by the initial point train generating means 171 to select and delete relaying (repeating) points in which the difference value therearound is sufficiently smaller than the threshold value by the difference detecting means 173 after re-construction of the curve.

It is to be noted that while, in the processing procedure shown in FIG. 34, since re-construction can be completed by a lesser number of points, there results the merit that curve editing thereafter is easy, the processing procedure which will be described later has the merit that because relaying (repeating) point interval for carrying out the path search can be small, processing time can be shortened.

Moreover, the point train obtained by the above-mentioned method is transformed (converted) into the curve by using curve generating means. Namely, by using edge information of the picture image in preparing the intermediate shape passing through portions between respective correspondence points by using the above-mentioned method, it has become possible to the prepare contour having high precision along the shape represented in the picture image.

Further, in the method shown in FIG. 19, such an approach may be employed to determine the edge of the picture image by using another algorithm at step S1105 to determine the intermediate shape along the edge of that picture image.

Namely, at step S102, a set of correspondence points determined by the picture image pursuit and the picture image are used to determine a color projection axis which maximizes contrast around the edge to form the edge of the picture image by using such color projection axis to determine intermediate shape along this edge.

Figure 35:
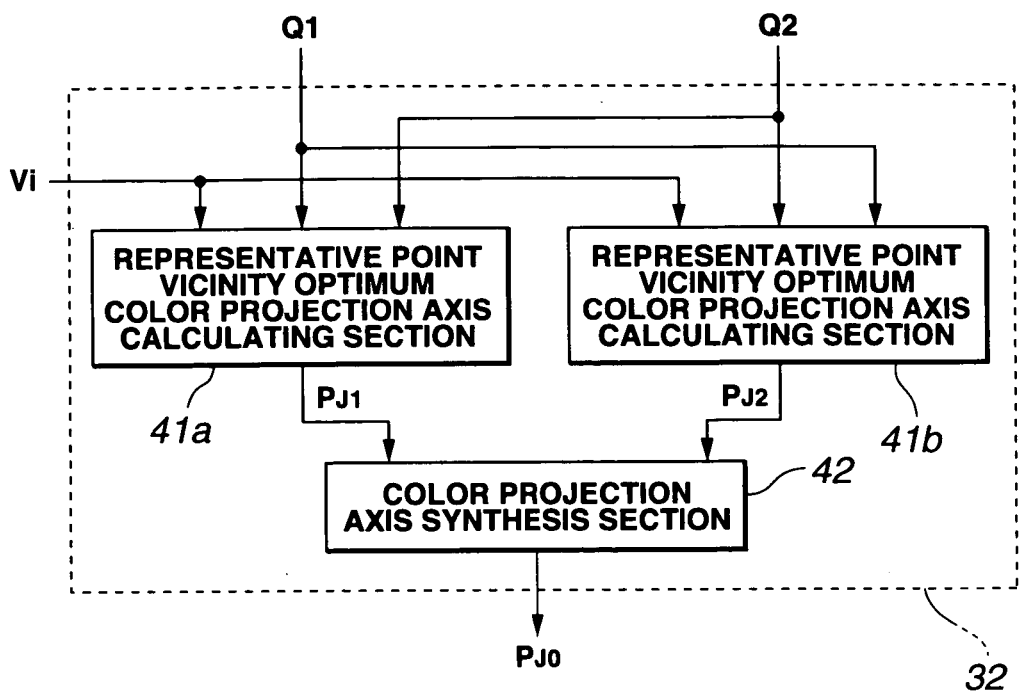
FIG. 35 is a block diagram showing the configuration of a more practical example of the optimum color projection axis calculating unit for determining the color projection axis.

The configuration of optimum color projection axis calculating unit 32 which inputs the set of correspondence points as representative points Q1 and Q2 to determine the color projection axis $P_{jo}$ is shown in FIG. 35.

The optimum color projection axis calculating unit 32 is composed of a representative point vicinity (neighboring) color projection axis calculating section 41a and a representative point vicinity (neighboring) optimum color projection axis calculating section 41b for calculating vicinity (neighboring) optimum color projection axes $P_{j1}$ and $P_{j2}$ within the region in the vicinity of representative points Q1 and Q2, and a color projection axis synthesis section 42 for synthesizing color projection axis $P_{jo}$ by using the color projection axis $P_{j1}$ and the color projection axis $P_{j2}$ from the above-mentioned two calculating sections 41a, 41b.

Figure 36:
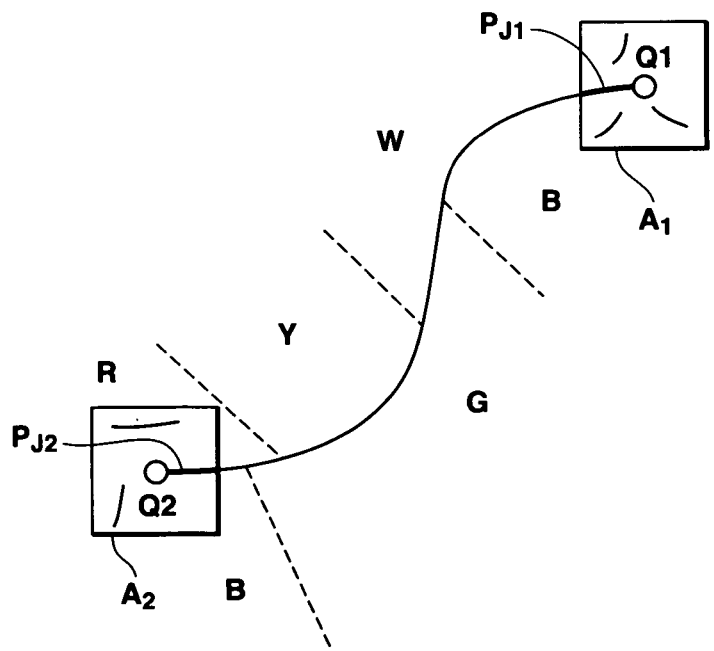
FIG. 36 is a view for explaining the operation principle of a more practical example of the optimum color projection axis calculating unit.

At the representative point vicinity (neighboring) optimum color projection axis calculating sections 41a and 41b, there are determined vicinity (neighboring) optimum color projection axes $P_{j1}$ and $P_{j2}$ which maximize contrast around the edge included within neighboring regions of representative points Q1 and Q2. It is now assumed that, as shown in FIG. 36, representative points Q1 and Q2 are determined within the regions color-separated by black B, white W, green G, yellow Y, red R and blue B. At this time, the representative point vicinity (neighboring) color projection axis calculating section 41a determines, by calculation, color projection axis $P_{j1}$ in which the contrast is a maximum of the edge included within the neighboring region A1 of representative point Q1. In addition, the representative point vicinity neighboring color projection axis calculating section 41b determines, by calculation, color projection axis $P_{j2}$ in which the contrast is a maximum of the edge included within the vicinity (neighboring) region A2 of the representative point Q2.

The color projection axis synthesis section 42 synthesizes vicinity (neighboring) optimum color projection axis $P_{j1}$, vicinity (neighboring) optimum color projection axis $P_{j2}$ respectively independently determined within the vicinity (neighboring) regions of representative points Q1, Q2 to determine one color projection axis $P_{jo}$ where the contrast is the maximum of the edge of the updating section. As the synthesis method in this case, e.g., the average vector of the color projection axes may be the axis after synthesis.

In addition, the maximum color projection axis calculating section 32 may determine the optimum color projection axis by the method shown in FIG. 37.

Figure 37B:
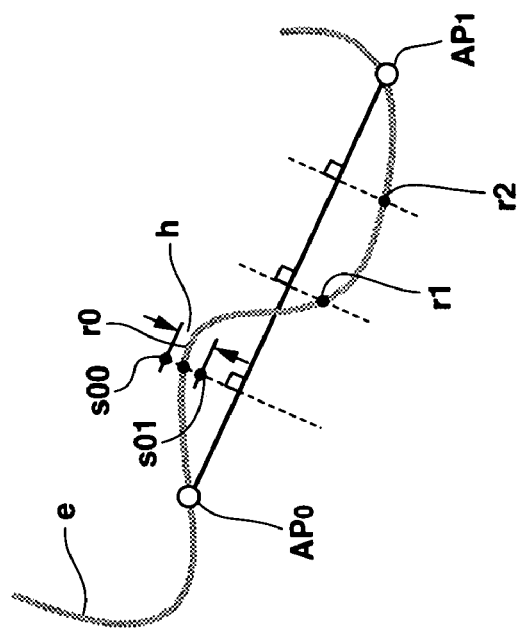
FIGS. 37A and 37B are views for explaining the operation principle of another more practical example of the optimum color projection axis calculating unit.
Figure 37A:
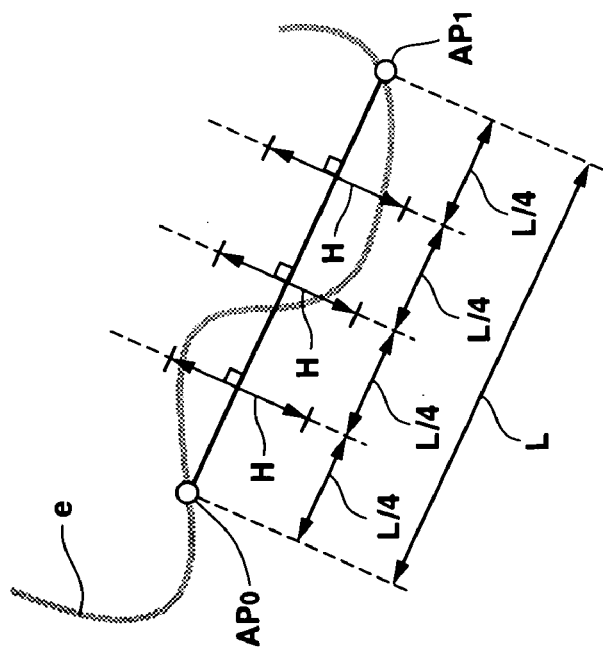

As shown in FIG. 37A, it is assumed that anchor point Ap0 and adjacent anchor point Ap1 are placed on edge e of the picture image. At this time, since there is the possibility that the edge e may deviate to much degree from the line segment connecting Ap0 and Ap1, there is carried out a search of the region where the color change is the greatest within the range of length H on the line segment in a direction perpendicular to Ap0Ap1 with respect to three points placed every equal interval with respect to line segment length L on the line segment Ap0Ap1, e.g., interval of L/4.

When the color with respect to a certain point r is assumed to be C(r), it is defined that the color change vector is dC/dr and its magnitude is |dC/dr|. Thus, r in which this value takes the maximum value is determined.

As the result of the search, r0, r1, r2 are assumed to be determined as shown in FIG. 37B. At this time, color change vectors dC/dr are respectively determined at r0, r1, r2 to allow its average value to be the optimum color projection axis.

In addition, the color change vector may be determined in a manner described below. In the case of r0, colors C(s00), C(s01) are determined with respect to points s00, s01 having r0 as a center and away from each other by distance width h on the straight line perpendicular to the line segment Ap0Ap1. Thus, the color change vector is substituted for its difference vector $\Delta C = C(s01) - C(s00)$. In connection with r1, r2, the color change vectors are respectively similarly determined.

The ordinary contour closed curve generating unit generates the contour closed curve on the basis of the optimum color projection axis which has been explained. At the step S105, the intermediate shape based on this contour closed curve is prepared.

In addition, when the algorithm shown in FIG. 19 is deformed and linear interpolation at the step S102 fails to be carried out because, e.g., movement of the picture image is suddenly carried out, the processing of the step S105 may be carried out.

As described above, in accordance with this invention, positional shift between the shape by linear interpolation and the shape actually determined, which was the problem of the prior art, can be solved.

INDUSTRIAL APPLICABILITY

As previously mentioned, in accordance with this invention, even in the case where a contour shape does not linearly move, it is possible to precisely pursue correspondence points on the contour. Thus, a contour shape having higher precision can be prepared.

What is claimed is:

1. A curve generating apparatus adapted for generating, from a correspondence point identified on a curve in a first frame, a curve in a second frame, wherein the curve in the first frame relates to an extracted feature in the first frame, the apparatus comprising:
   correspondence point detecting means for determining a correspondence point in the second frame corresponding to the correspondence point identified in the first frame; and
   curve generating means for generating a curve in the second frame passing through the correspondence point in the second frame, wherein the curve in the second frame represents an outline of the extracted feature in the second frame,
   wherein a picture image pursuit of the correspondence point identified on the curve in the first frame is used to determine the correspondence point in the second frame by determining analogousness between a first image portion including the correspondence point identified in the first frame and a second image portion including the correspondence point in the second frame by determining an absolute value sum of differences of respective pixel values within the first image portion and the second image portion,
   wherein the curve generating means is adapted so that, when the first frame is caused to be the frame at the time of start and a frame at the time of end is caused to be a third frame, it determines an interpolated curve by linear interpolation from the curve in the first frame and a curve in the third frame to deform this interpolated curve into the curve passing through the correspondence point, which is calculated by affine transformation, in the second frame,
   wherein the interpolative curve is determined by linear interpolation using a path search method, and
   wherein the path search method extracts a path that passes close to a portion of the curve having a higher gradient strength.

2. The curve generating apparatus as set forth in claim 1, wherein the curve generating means generates, as the curve in the second frame, a shape along an edge of a picture image passing through the correspondence point in the second frame.

3. The curve generating apparatus as set forth in claim 1, wherein the curve generating means generates, as the curve in the second frame, a contour curve of an object in a picture image.

4. The curve generating apparatus as set forth in claim 1, wherein the curve generating means determines the interpolated curve by:
   determining a length of a round portion of the curve in the first frame and a length of a round portion of the curve in the third frame;
   determining a sampling interval along the length of the round portion of the curve in the first frame and the length of the round portion of the curve in the third frame;
   executing re-sampling processing of the curve in the first fame and the curve in the third frame at the determined sampling intervals; and
   preparing the curve passing through the correspondence point in the second frame based on the re-sampling processing.

5. The curve generating apparatus as set forth in claim 1, wherein the interpolative curve is determined by linear interpolation using a color projection axis of the curve passing through a set of correspondence points.

6. The curve generating apparatus as set forth in claim 1, wherein the interpolative curve is determined by linear interpolation using a Bezier curve.

7. The curve generating apparatus as set forth in claim 1, wherein the interpolative curve is determined by linear interpolation using a B-spline curve.

8. A curve generating method for generating, from a correspondence point identified on a curve in a first frame, a curve in a second frame, wherein the curve in the first frame relates to an extracted feature in the first frame, the method comprising the steps of:
   determining a correspondence point in the second frame corresponding to the correspondence point identified in the first frame; and
   generating a curve in the second frame passing through the correspondence point in the second frame, wherein the curve in the second frame represents an outline of the extracted feature in the second frame,
   wherein a picture image pursuit of the correspondence point identified on the curve in the first frame is used to determine the correspondence point in the second frame by determining analogousness between a first image portion including the correspondence point identified in the first frame and a second image portion including the correspondence point in the second frame by determining an absolute value sum of differences of respective pixel values within the first image portion and the second image portion,
   wherein generating the curve comprises, when the first frame is assumed to be the frame at the time of start and a frame at the time of end is assumed to be a third frame, an interpolated curve is determined by linear interpolation from the curve in the first frame and a curve in the third frame to deform this interpolated curve into the curve passing through the correspondence point, which is calculated by affine transformation, in the second frame,
   wherein the interpolative curve is determined by linear interpolation using a path search method, and
   wherein the path search method extracts a path that passes close to a portion of the curve having a higher gradient strength.

9. The curve generating method as set forth in claim 8, wherein generating the curve comprises generating, as the curve in the second frame, a shape along an edge of a picture image passing through the correspondence point in the second frame.

10. The curve generating method as set forth in claim 8, wherein generating the curve comprises generating, as the curve in the second frame, a contour curve of an object in a picture image.

11. The curve generating method as set forth in claim 8, wherein the curve generating means determines the interpolated curve by:
   determining a length of a round portion of the curve in the first frame and a length of a round portion of the curve in the third frame;
   determining a sampling interval along the length of the round portion of the curve in the first frame and the length of the round portion of the curve in the third frame;
   executing re-sampling processing of the curve in the first fame and the curve in the third frame at the determined sampling intervals; and
   preparing the curve passing through the correspondence point in the second frame based on the re-sampling processing.

12. A program recording medium adapted so that there is recorded program relating to curve generating processing for generating, from a correspondence point identified on a curve in a first frame, a curve in a second frame, wherein the curve in the first frame relates to an extracted feature in the first frame, the program comprising:
   a correspondence point detection step of determining a correspondence point in the second frame corresponding to the correspondence point identified in the first frame; and
   a curve generation step of generating a curve in the second frame passing through the correspondence point in the second frame, wherein the curve in the second frame represents an outline of the extracted feature in the second frame,
   wherein a picture image pursuit of the correspondence point identified on the curve in the first frame is used to determine the correspondence point in the second frame by determining analogousness between a first image portion including the correspondence point identified in the first frame and a second image portion including the correspondence point in the second frame by determining an absolute value sum of differences of respective pixel values within the first image portion and the second image portion,
   wherein the curve generating means is adapted so that, when the first frame is caused to be the frame at the time of start and a frame at the time of end is caused to be a third frame, it determines an interpolated curve by linear interpolation from the curve in the first frame and a curve in the third frame to deform this interpolated curve into the curve passing through the correspondence point, which is calculated by affine transformation, in the second frame,
   wherein the interpolative curve is determined by linear interpolation using a path search method, and
   wherein the path search method extracts a path that passes close to a portion of the curve having a higher gradient strength.

* * * * *